(12) United States Patent
Kashitani

(10) Patent No.: US 11,282,228 B2
(45) Date of Patent: Mar. 22, 2022

(54) INFORMATION PROCESSING DEVICE, INFORMATION PROCESSING METHOD, AND PROGRAM

(71) Applicant: SONY CORPORATION, Tokyo (JP)

(72) Inventor: Tatsuki Kashitani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/046,368

(22) PCT Filed: Feb. 27, 2019

(86) PCT No.: PCT/JP2019/007418
§ 371 (c)(1),
(2) Date: Oct. 9, 2020

(87) PCT Pub. No.: WO2019/216000
PCT Pub. Date: Nov. 14, 2019

(65) Prior Publication Data
US 2021/0134004 A1 May 6, 2021

(30) Foreign Application Priority Data
May 8, 2018 (JP) .............................. JP2018-089793

(51) Int. Cl.
*H04N 17/00* (2006.01)
*G06T 7/73* (2017.01)
(Continued)

(52) U.S. Cl.
CPC ................ *G06T 7/73* (2017.01); *G01P 15/18* (2013.01); *G06T 7/13* (2017.01); *G06T 7/80* (2017.01);
(Continued)

(58) Field of Classification Search
CPC .... G06T 7/73; G06T 7/80; G06T 7/13; G06T 2207/30244; G01P 15/18; H04N 17/002;
(Continued)

(56) References Cited

U.S. PATENT DOCUMENTS 6,968,094 B1\* 11/2005 Gallagher .............. G06K 9/209
348/E5.046
2011/0032220 A1\* 2/2011 Shih ..................... G06K 9/3208
345/204

(Continued)

FOREIGN PATENT DOCUMENTS

| JP | 3728900 B2 | 12/2005 |
| JP | 2015-117943 A | 6/2015 |
| JP | 2017-224984 A | 12/2017 |

OTHER PUBLICATIONS

João Alves et al., Camera-Inertial Sensor modelling and alignment for Visual Navigation, Proceedings of ICAR 2003, The 11th International Conference on Advanced Robotics, Jun. 30-Jul. 3, 2003, pp. 1693-1698, Coimbra, Portugal.

(Continued)

*Primary Examiner* — Michael Lee
(74) *Attorney, Agent, or Firm* — Paratus Law Group, PLLC

(57) ABSTRACT

There is provided an information processing device that enables recognition of a posture relationship between an imaging unit and a detection unit in a more favorable mode. The information processing device includes an acquisition unit configured to acquire an image captured by an imaging unit and a detection result of a gravitational acceleration by a detection unit supported by the imaging unit, for each of a plurality of viewpoints different from one another, an image processing unit configured to extract a plurality of line segments extending in a gravity direction from the image and specify an intersection of straight lines obtained (Continued)

by respectively extending the plurality of line segments on the basis of a subject captured in the image for the each viewpoint, and a calculation unit configured to calculate a relative posture relationship between the imaging unit and the detection unit on the basis of the detection result of the gravitational acceleration acquired for each of the plurality of viewpoints and the intersection specified for the each of the plurality of viewpoints.

13 Claims, 10 Drawing Sheets

(51) Int. Cl.
*G06T 7/80* (2017.01)
*G06T 7/13* (2017.01)
*G01P 15/18* (2013.01)
*G06F 3/01* (2006.01)

(52) U.S. Cl.
CPC ......... *H04N 17/002* (2013.01); *G06F 3/012* (2013.01); *G06T 2207/30244* (2013.01)

(58) Field of Classification Search
CPC ............ G06F 3/012; G02B 2027/0187; G02B 27/017; G06K 9/209; G06K 9/3208; G06K 9/00671
USPC ....................................................... 348/135
See application file for complete search history.

(56) References Cited

U.S. PATENT DOCUMENTS

| | | | |
|---|---|---|---|
| 2014/0050359 A1* | 2/2014 | Takahashi | G06T 7/579 382/103 |
| 2014/0198227 A1* | 7/2014 | Mohammad Mirzaei | G06K 9/3208 348/208.2 |
| 2015/0178924 A1* | 6/2015 | Chao | G06T 7/80 348/187 |
| 2015/0245020 A1* | 8/2015 | Meier | G06T 7/73 348/135 |
| 2015/0371440 A1* | 12/2015 | Pirchheim | G06T 7/73 345/419 |
| 2016/0005164 A1 | 1/2016 | Roumeliotis et al. | |
| 2016/0012593 A1* | 1/2016 | Chao | G06T 7/337 382/209 |
| 2017/0069088 A1* | 3/2017 | Shechtman | G06T 15/20 |
| 2017/0076434 A1* | 3/2017 | Pyo | G06T 3/60 |
| 2017/0372481 A1* | 12/2017 | Onuki | G06T 7/00 |
| 2018/0196336 A1* | 7/2018 | Bassi | H04N 9/3194 |
| 2020/0005490 A1* | 1/2020 | Paik | G06K 9/00771 |

OTHER PUBLICATIONS

Jorge Lobo et al., Vision and Inertial Sensor Cooperation Using Gravity as a Vertical Reference, IEEE Transactions on Pattern Analysis and Machine Intelligence, Dec. 2003, pp. 1597-1608, vol. 25, No. 12, IEEE.

* cited by examiner

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2019/007418 (filed on Feb. 27, 2019) under 35 U.S.C. § 371, which claims priority to Japanese Patent Application No. 2018-089793 (filed on May 8, 2018), which are all hereby incorporated by reference in their entirety.

TECHNICAL FIELD

The present disclosure relates to an information processing device, an information processing method, and a program.

BACKGROUND ART

With the development of image processing technologies, various recognition technologies using a captured image have been proposed, such as analyzing an image captured by an imaging unit like a digital camera (in other words, an image sensor), thereby recognizing a subject captured in the image and recognizing an environment around the imaging unit. In addition, in recent years, a more advanced recognition technology using an analysis result of a captured image and a detection result of a detection unit such as an acceleration sensor or an angular velocity sensor (for example, an inertial measurement unit (IMU)) has been also proposed. Such recognition technologies enable implementation of self-position estimation of a device in which the imaging unit and the detection unit are supported, for example. Therefore, the recognition technologies are also applied to, for example, augmented reality (AR) technologies, virtual reality (VR) technologies, and robotics.

CITATION LIST

Patent Document

Patent Document 1: Japanese Patent Application Laid-Open No. 2015-117943
Patent Document 2: Japanese Patent No. 3728900

SUMMARY OF THE INVENTION

Problems to be Solved by the Invention

In the above-described recognition technologies, there are many cases where the imaging unit and various sensors used for recognition are calibrated to maintain recognition accuracy. For example, Patent Document 1 discloses an example of a technology regarding calibration of a sensor that can be used for implementing the above-described recognition technologies. Furthermore, Patent Document 2 discloses an example of a technology regarding calibration of an imaging unit that can be used for implementing the above-described recognition technologies.

In particular, in the recognition technology using an analysis result of a captured image by an imaging unit and a detection result by a detection unit, accurate recognition of a relative posture of one unit to the other is important between the imaging unit and the detection unit. In other words, to implement the above-described recognition technology in a more favorable mode, introduction of a technology (for example, a technology regarding calibration) that enables a decrease in influence of variation (error) of the relative posture of one unit to the other unit between the imaging unit and the detection unit, the variation (error) being caused when the imaging unit and the detection unit are attached, is required.

Therefore, the present disclosure proposes a technology for enabling recognition of a posture relationship between an imaging unit and a detection unit in a more favorable mode.

Solutions to Problems

According to the present disclosure, provided is an information processing device including: an acquisition unit configured to acquire an image captured by an imaging unit and a detection result of a gravitational acceleration by a detection unit supported by the imaging unit, for each of a plurality of viewpoints different from one another; an image processing unit configured to extract a plurality of line segments extending in a gravity direction from the image and specify an intersection of straight lines obtained by respectively extending the plurality of line segments on the basis of a subject captured in the image for the each viewpoint; and a calculation unit configured to calculate a relative posture relationship between the imaging unit and the detection unit on the basis of the detection result of the gravitational acceleration acquired for each of the plurality of viewpoints and the intersection specified for each of the plurality of viewpoints.

Furthermore, according to the present disclosure, provided is an information processing method, by a computer, including: acquiring an image captured by an imaging unit and a detection result of a gravitational acceleration by a detection unit supported by the imaging unit, for each of a plurality of viewpoints different from one another; extracting a plurality of line segments extending in a gravity direction from the image and specify an intersection of straight lines obtained by respectively extending the plurality of line segments on the basis of a subject captured in the image for the each viewpoint; and calculating a relative posture relationship between the imaging unit and the detection unit on the basis of the detection result of the gravitational acceleration acquired for each of the plurality of viewpoints and the intersection specified for each of the plurality of viewpoints.

Furthermore, according to the present disclosure, provided is a program for causing a computer to execute: acquiring an image captured by an imaging unit and a detection result of a gravitational acceleration by a detection unit supported by the imaging unit, for each of a plurality of viewpoints different from one another; extracting a plurality of line segments extending in a gravity direction from the image and specify an intersection of straight lines obtained by respectively extending the plurality of line segments on the basis of a subject captured in the image for the each viewpoint; and calculating a relative posture relationship between the imaging unit and the detection unit on the basis of the detection result of the gravitational acceleration acquired for each of the plurality of viewpoints and the intersection specified for each of the plurality of viewpoints.

Effects of the Invention

As described above, according to the present disclosure, there is provided a technology for enabling recognition of a posture relationship between an imaging unit and a detection unit in a more favorable manner.

Note that the above-described effect is not necessarily limited, and any of effects described in the present specification or other effects that can be grasped from the present specification may be exerted in addition to or in place of the above-described effect.

MODE FOR CARRYING OUT THE INVENTION

A favorable embodiment of the present disclosure will be described in detail with reference to the appended drawings. Note that, in the present specification and drawings, redundant description of configuration elements having substantially the same functional configuration is omitted by providing the same sign.

Note that the description will be given in the following order.

1. System Configuration
2. Functional Configuration
3. Calibration Method
3.1. Calibration Principle
3.2. Calibration Processing Flow
4. Modification
4.1. Modification 1: Example of Calibration Method
4.2. Modification 2: Example of Calculation Method of Coordinate Conversion Function
4.3. Modification 3: UI Example
5. Hardware Configuration
6. Application
7. Conclusion

1. SYSTEM CONFIGURATION

Figure 1:
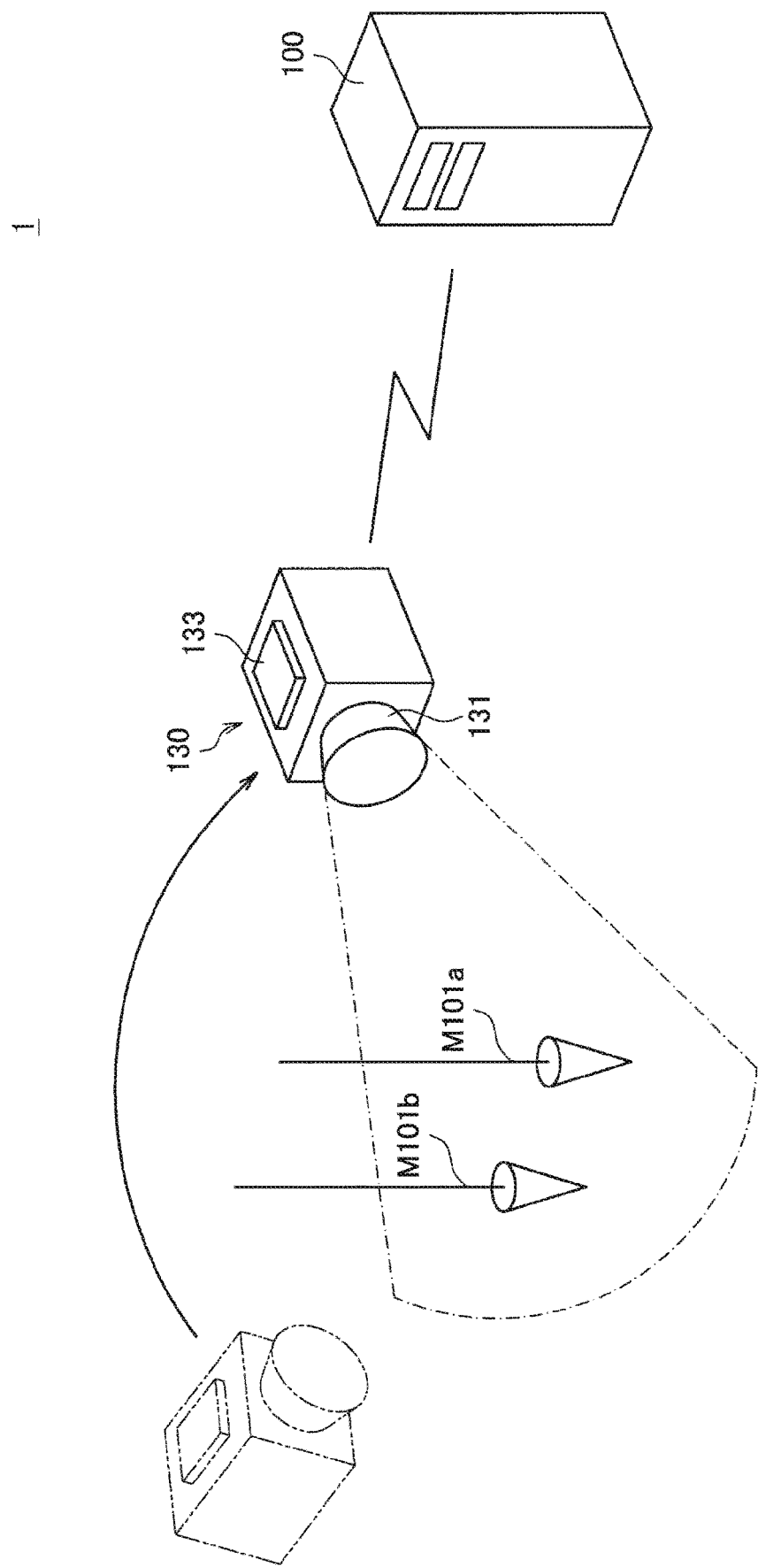
FIG. 1 is an explanatory diagram for describing an outline of an example of a system configuration of an information processing system according to an embodiment of the present disclosure.

First, an example of a schematic system configuration of an information processing system according to an embodiment of the present disclosure will be described with reference to FIG. 1. FIG. 1 is an explanatory diagram for describing an outline of an example of a system configuration of an information processing system according to an embodiment of the present disclosure.

As illustrated in FIG. 1, an information processing system 1 according to the present embodiment includes an information acquisition device 130 and an information processing device 100. The information acquisition device 130 and the information processing device 100 are configured to be able to transmit and receive information to and from each other via a predetermined network. Note that the type of the network connecting the information acquisition device 130 and the information processing device 100 is not especially limited. As a specific example, the network may be configured by a so-called wireless network such as a network based on a Wi-Fi (registered trademark) standard. Furthermore, as another example, the network may be configured by the Internet, a dedicated line, a local area network (LAN), a wide area network (WAN), or the like. Furthermore, the network may include a plurality of networks, and at least a part of the networks may be configured as a wired network.

The information acquisition device 130 schematically illustrates a device for acquiring information used for implementing various recognition technologies (in other words, information used for recognizing various states). As a specific example, in a case of assuming a situation of recognizing various states for self-position estimation, the information acquisition device 130 corresponds to a moving body to be estimated for a self-position or a device that collects various types of information for implementing the self-position estimation supported by the moving body.

As illustrated in FIG. 1, the information acquisition device 130 includes an imaging unit 131 for capturing an image of a surrounding environment, and a detection unit 133 (for example, an IMU) for detecting changes in the position and posture of the information acquisition device 130, such as acceleration and angular velocity. The imaging unit 131 and the detection unit 133 are supported such that a relative relationship of at least the postures satisfies a predetermined relationship between the respective positions and postures. As a specific example, the imaging unit 131 and the detection unit 133 are favorably supported such that the relative posture relationship is fixed at least at the time of acquiring information for calibration to be described below. As a more specific example, the imaging unit 131 and the detection unit 133 are favorably integrally supported. Furthermore, the imaging unit 131 and the detection unit 133 may be configured such that one unit is attachable to and detachable from the other unit.

The information processing device 100 calibrates each configuration such as the imaging unit 131 and the detection unit 133 supported by the information acquisition device 130. In particular, the information processing device 100 according to the present embodiment calibrates variation in the relative posture of one unit to the other unit between the imaging unit 131 and the detection unit 133, which may occur for each information acquisition device 130.

Specifically, there are some cases where installation of the imaging unit 131 and the detection unit 133 at the same position is practically difficult. In this case, a local coordinate system of the imaging unit 131 (that is, a coordinate system indicating relative position and direction with respect to the imaging unit 131 as a base point) and a local coordinate system of the detection unit 133 (that is, a coordinate system indicating relative position and direction with respect to the detection unit 133 as a base point) do not necessarily match. In such a situation, the local coordinate system of the imaging unit 131 and the local coordinate system of the detection unit 133 may be made to correspond to each other. More specifically, conversion from one coordinate system into the other coordinate system may be performed between the local coordinate system of the imaging unit 131 and the local coordinate system of the detection unit 133, by using a predetermined conversion function. Meanwhile, there are some cases variation occurs in the relative relationship between the posture of the imaging unit 131 and the posture of the detection unit 133, for each information acquisition device 130, according to errors relating to attachment of the imaging unit 131 and the detection unit 133 or the like. Such variation may be one of factors of reduction in recognition accuracy in recognition processing using an imaging result of an image by the imaging unit 131 and a detection result by the detection unit 133, for example. In view of such a situation, the information processing device 100 according to the present embodiment calibrates the variation in the relative posture of one unit to the other unit between the imaging unit 131 and the detection unit 133, which may occur for each information acquisition device 130.

Specifically, the information processing device 100 acquires an image captured by the imaging unit 131 from a viewpoint and a detection result of gravitational acceleration by the detection unit 133 at the viewpoint from the information acquisition device 130, for each of a plurality of viewpoints different from one another. Note that, in the present disclosure, the "viewpoint" indicates a position or a posture of the information acquisition device 130 (and thus the imaging unit 131). As a more specific example, the "viewpoint" in the present disclosure corresponds to, in a case where an optical axis of the imaging unit 131 is viewed as a line-of-sight, the position where the imaging unit 131 serving as a base point of the line-of-sight is held or the posture of the imaging unit 131. At this time, the position of each viewpoint and a subject to be captured by the imaging unit 131 are set such that a plurality of line segments extending in a gravity direction is extracted from the image captured by the imaging unit 131. For example, in the example illustrated in FIG. 1, thread-like objects M101a and M101b with fixed one ends are the subjects, and the imaging unit 131 captures images of the objects M101a and M101b from a plurality of viewpoints different from one another. Note that details of a calibration method will be described below.

An example of a schematic system configuration of an information processing system according to an embodiment of the present disclosure has been described with reference to FIG. 1. Note that the above-described system configuration is a mere example, and does not necessarily limit the system configuration of the information processing system 1 according to the present embodiment. As a specific example, the information acquisition device 130 and the information processing device 100 may be integrally configured. Furthermore, the functions of the information processing device 100 may be implemented by a plurality of devices that operates in cooperation with each other.

2. FUNCTIONAL CONFIGURATION

Figure 2:
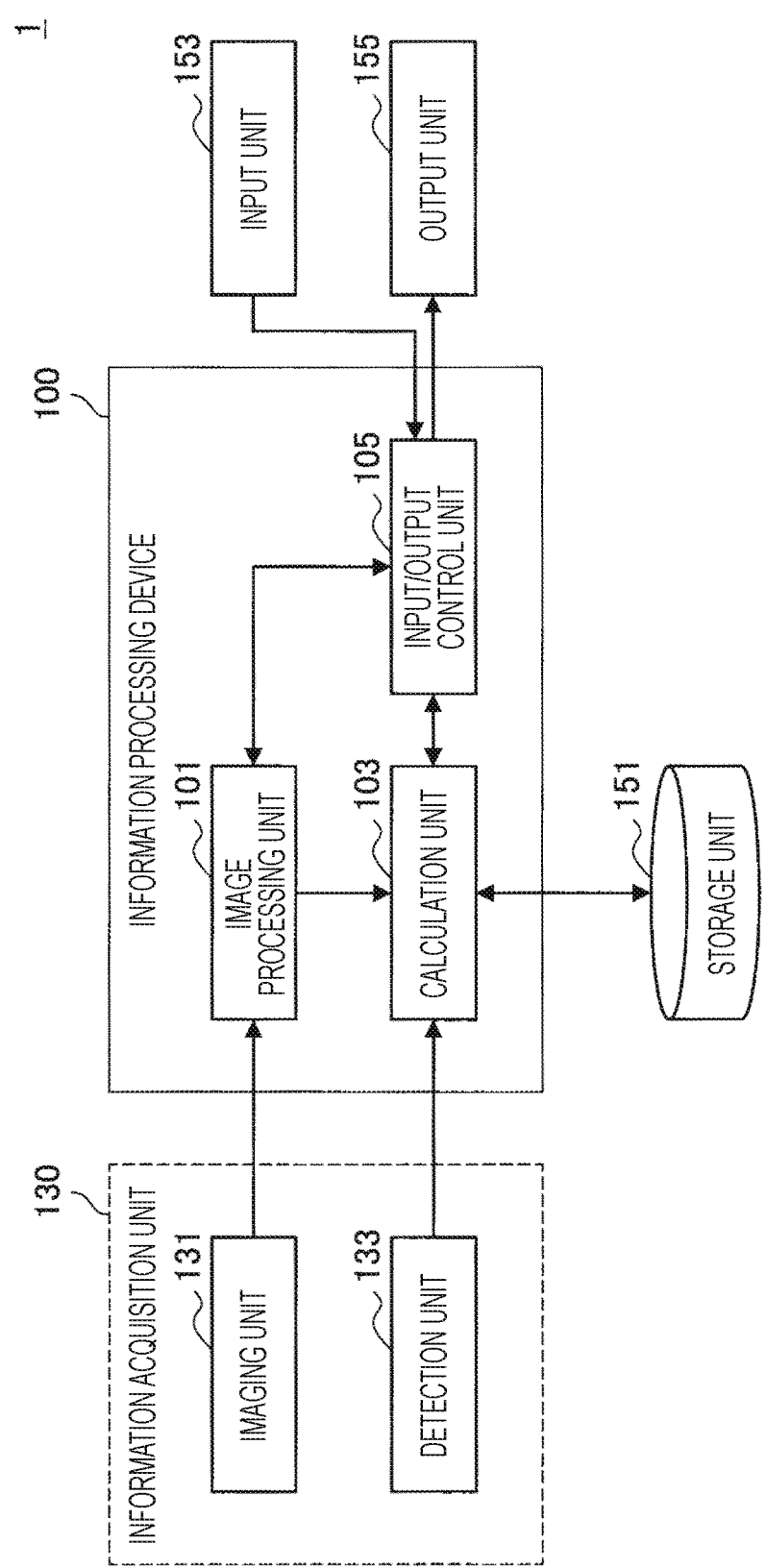
FIG. 2 is a block diagram illustrating an example of a functional configuration of the information processing system according to the embodiment.

Next, an example of a functional configuration of the information processing system according to the embodiment of the present disclosure will be described with reference to FIG. 2. FIG. 2 is a block diagram illustrating an example of a functional configuration of the information processing system according to the present embodiment.

As illustrated in FIG. 2, the information processing system 1 according to the present embodiment includes an information acquisition device 130, an information processing device 100, and a storage unit 151. Furthermore, the information processing system 1 according to the present embodiment may include an input unit 153 and an output unit 155. Note that the information acquisition device 130 corresponds to the information acquisition device 130 illustrated in FIG. 1. That is, an imaging unit 131 and a detection unit 133 correspond to the imaging unit 131 and the detection unit 133 illustrated in FIG. 1. Therefore, detailed description of the information acquisition device 130, and the imaging unit 131 and the detection unit 133 included in the information acquisition device 130 will be omitted.

The information processing device 100 corresponds to the information processing device 100 illustrated in FIG. 1. As illustrated in FIG. 2, the information processing device 100 includes an image processing unit 101 and a calculation unit 103. Furthermore, the information processing device 100 may also include an input/output control unit 105.

The image processing unit 101 acquires an image captured by the imaging unit 131 for each of a plurality of viewpoints, and applies analysis processing (image analysis) to the image captured for the each viewpoint, thereby extracting a plurality of line segments extending in the gravity direction from the image on the basis of a subject captured in the image. Furthermore, the image processing unit 101 specifies an intersection of straight lines obtained by respectively extending the plurality of line segments in the image on the basis of an extraction result of the plurality of line segments from the image. Then, the image processing unit 101 outputs, for each of the plurality of viewpoints, information indicating the intersection of the straight lines obtained by respectively extending the plurality of line segments extracted from the image corresponding to the viewpoint to the calculation unit 103.

Furthermore, the image processing unit 101 may cause a user to specify a subject from which the line segment is to be extracted and a line segment to be used for specifying the intersection. In this case, the image processing unit 101 may present the image captured by the imaging unit 131 to the user by causing a predetermined output unit (for example, the output unit 155 to be described below) to output the image via the input/output control unit 105 to be described below. Furthermore, the image processing unit 101 may acquire information for the image presented to the user via the input/output control unit 105, the information according to specification by the user via a predetermined input unit (for example, the input unit 153 to be described below). Then, the image processing unit 101 may determine the subject from which the line segment is to be extracted and the line segment to be used for specifying the intersection according to the specification by the user.

The calculation unit 103 acquires information according to the acceleration detection result by the detection unit 133 to specify the direction of gravitational acceleration (in other words, a gravitational acceleration vector) in the local coordinate system of the detection unit 133, for each of the plurality of viewpoints. As a specific example, the acceleration detected by the detection unit 133 in a state where the detection unit 133 (and thus the information acquisition device 130) is stationary can correspond to the gravitational acceleration. Therefore, for example, the calculation unit 103 recognizes information indicating the acceleration detection result by the detection unit 133 acquired in the state where the detection unit 133 is stationary, as the information indicating the gravitational acceleration detection result by the detection unit 133. Of course, the method is not particularly limited as long as the direction of the gravitational acceleration in the local coordinate system of the detection unit 133 can be specified according to the detection result of the acceleration or the angular velocity by the detection unit 133. Furthermore, at this time, the calculation unit 103 may specify the direction of the gravitational acceleration in consideration of calibration data (for example, a bias and a scale factor) of the detection unit 133, which has been acquired in advance. The calibration data of the detection unit 133 may be stored in advance in a storage area that the calculation unit 103 can refer to (for example, the storage unit 151 to be described below). Note that, in the following description, the gravitational acceleration vector (that is, the gravitational acceleration direction) in the local coordinate system of the detection unit 133, which is specified as described above, may be referred to as a "gravitational acceleration vector a" for convenience. Furthermore, the local coordinate system of the detection unit 133 corresponds to an example of a "second coordinate system".

Furthermore, the calculation unit 103 acquires, for each of the plurality of viewpoints at which the acceleration detection result has been acquired by the detection unit 133, the information indicating the intersection of the straight lines obtained by respectively extending the plurality of line segments extracted from the image corresponding to the viewpoint from the image processing unit 101. The calculation unit 103 calculates, for each of the plurality of viewpoints, a vector indicating the gravity direction in the local coordinate system of the imaging unit 131, the vector corresponding to the viewpoint, on the basis of the information indicating the intersection of the straight lines obtained by respectively extending the plurality of line segments. Furthermore, at this time, the calculation unit 103 may calculate the vector in the gravity direction in consideration of calibration data (for example, lens distortion and a calibration result of internal parameters) of the imaging unit 131, which has been acquired in advance. The calibration data of the imaging unit 131 may be stored in advance in a storage area that the calculation unit 103 can refer to (for example, the storage unit 151 to be described below). Note that, in the following description, the vector in the gravity direction in the local coordinate system of the imaging unit 131, which is specified as described above, may be referred to as a "gravity direction vector c" for convenience. Furthermore, the local coordinate system of the imaging unit 131 corresponds to an example of a "first coordinate system".

Then, the calculation unit 103 calculates a relative posture relationship between the imaging unit 131 and the detection unit 133 on the basis of the gravitational acceleration vector a and the gravity direction vector c at each of the plurality of viewpoints. Specifically, the calculation unit 103 calculates a function R for converting one unit into another unit between the local coordinate system of the imaging unit 131 and the local coordinate system of the detection unit 133 on the basis of the gravitational acceleration vector a and the gravity direction vector c for each viewpoint. Then, the calculation unit 103 causes a predetermined storage area (for example, the storage unit 151 to be described below) to store information indicating a calculation result of the function R. Note that the function R calculated at this time is calculated according to actual installation positions of the imaging unit 131 and the detection unit 133. Therefore, by using the function R for coordinate conversion between the imaging unit 131 and the detection unit 133, conversion considering errors relating to attachment of the imaging unit 131 and the detection unit 133 (that is, conversion in which the error is calibrated) can be performed. Note that details of the method of calculating the function R (that is, calibration) will be described below.

Furthermore, the calculation unit 103 may cause a predetermined output unit to output, via the input/output control unit 105, information for guiding movement of the information acquisition device 130 to the position of a new viewpoint so as to acquire information of the new viewpoint according to an acquisition situation of information of each viewpoint. The user guides the information acquisition device 130 to change the position and posture by the control, so that acquisition of the information regarding the gravitational acceleration vector a and calculation of the information regarding the gravity direction vector c become possible. In other words, in a case where the number of samples is insufficient as information for calculating the function R (the above-described information acquired for each viewpoint), the user can be guided to enable acquisition of new samples for calculating the function R in a more favorable mode. Note that an example of a user interface (UI) regarding the guidance will be described below as modifications.

The storage unit 151 is a storage area for temporarily or constantly storing various data. For example, the storage unit 151 may store data for the information processing device 100 to execute various functions. As a specific example, the storage unit 151 may store data (for example, a library) for executing various applications, management data for managing various settings, and the like. Furthermore, the storage unit 151 may store the information according to the result of calibration performed by the calculation unit 103 (that is, the function R for performing coordinate conversion between the imaging unit 131 and the detection unit 133).

The input unit 153 corresponds to an input interface for the user to input various types of information to the information processing device 100. The input unit 153 may include, for example, an input device such as a button, a lever, and a touch panel. Note that the configuration of the input unit 153 is not especially limited as long as the user can input information to the information processing device 100. As a specific example, the input unit 153 may include a sound collection unit for collecting voice of the user and may acquire the voice of the user input to the sound collection unit as information input by the user.

The output unit 155 is an output interface for presenting various types of information to the user by the information processing device 100. The output unit 155 may include, for example, a display device that outputs an image such as a still image or a moving image, such as a so-called display. Note that the configuration of the output unit 155 is not especially limited as long as the information processing device 100 can present various types of information to the user. As a specific example, the output unit 155 may include an acoustic device that outputs sound, such as a speaker. Furthermore, the output unit 155 may include a vibrating device that presents information to the user by vibrating in a pattern corresponding to the information to be presented, such as a so-called vibrator.

Note that, although not explicitly illustrated in FIG. 2, configurations corresponding to a portion that acquires the image captured by the imaging unit 131 and a portion that acquires the detection result from the detection unit 133, of the information processing device 100, correspond to an example of an "acquisition unit". That is, the portion that acquires the image captured by the imaging unit 131, of the image processing unit 101, and a portion that acquires the detection result from the detection unit 133, of the calculation unit 103, can correspond to an example of the "acquisition unit". In other words, the interface of the information processing device 100 for acquiring the various types of information from the imaging unit 131 and the detection unit 133 can correspond to an example of the "acquisition unit".

An example of a functional configuration of the information processing system according to the embodiment of the present disclosure has been described with reference to FIG. 2. Note that the above-described functional configuration is a mere example, and does not necessarily limit the functional configuration of the information processing system 1 according to the present embodiment. As a specific example, the information acquisition device 130 and the information processing device 100 may be integrally configured, as described above. Furthermore, as another example, at least part of the configurations of the storage unit 151, the input unit 153, and the output unit 155 may be included in the information processing device 100. Furthermore, part of the configurations of the information processing device 100 may be provided outside the information processing device 100. Furthermore, the functions of the information processing device 100 may be implemented by a plurality of devices that operate in cooperation with each other.

3. CALIBRATION METHOD

Next, hereinafter, an example of a method of calibrating the relative posture relationship between the imaging unit 131 and the detection unit 133, which is executed by the information processing device 100 according to the embodiment of the present disclosure, will be described in detail. Note that, in the following description, the calibration executed by the information processing device 100 will be simply referred to as "calibration according to the present embodiment" for convenience.

<3.1. Calibration Principle>

Figure 3:
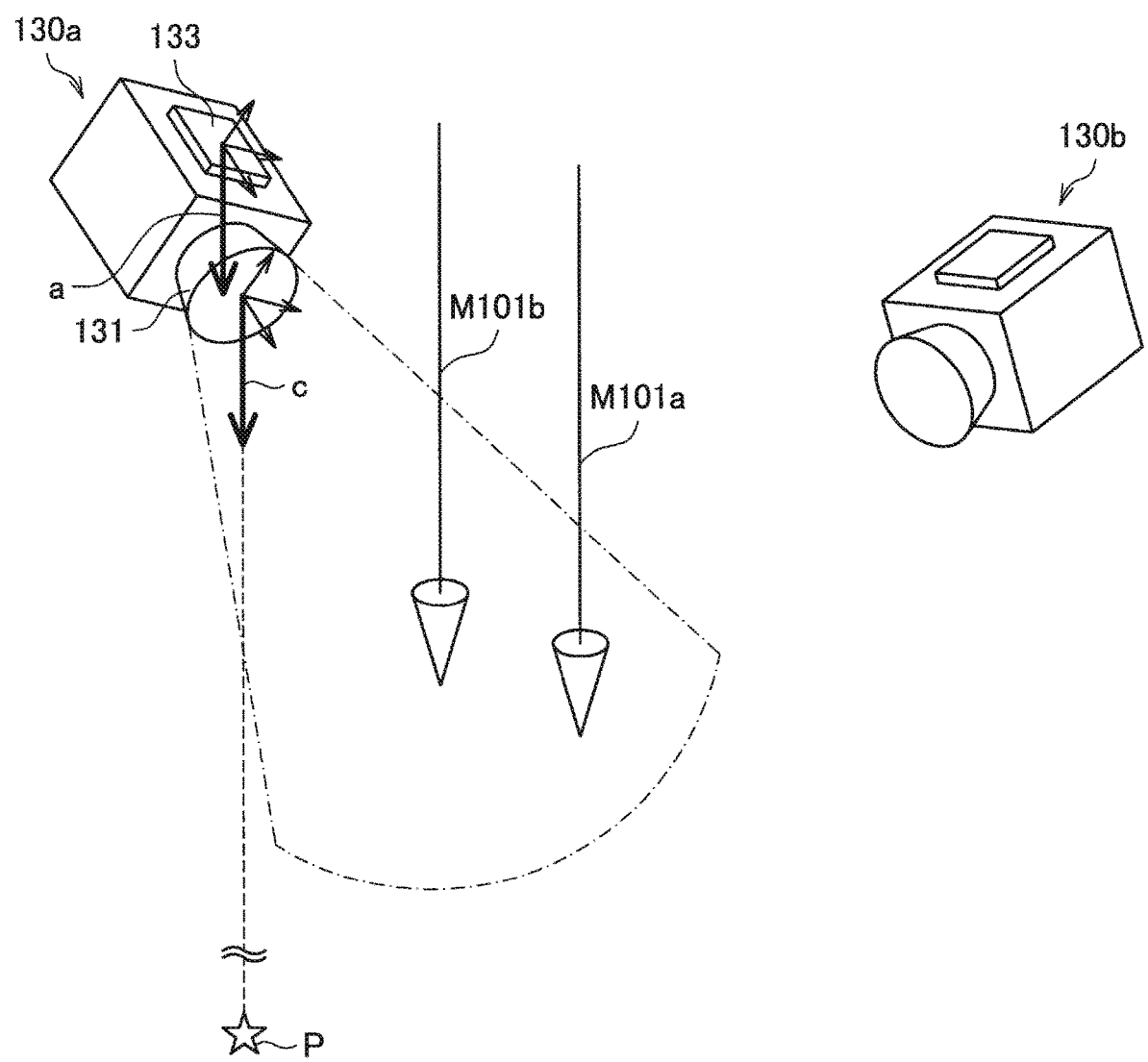
FIG. 3 is an explanatory diagram for describing an outline of a principle of calibration according to the embodiment.

First, an outline of a principle of calibration according to the present embodiment will be described with reference to FIG. 3. FIG. 3 is an explanatory diagram for describing an outline of a principle of calibration according to the present embodiment. Note that in FIG. 3, reference numerals 130a and 130b schematically illustrate viewpoints different from each other at which the information acquisition device 130 is held (in other words, the information processing devices 130 held at positions and postures different from each other).

(Calculation of Gravity Direction Vector c)

The information processing device 100 according to the present embodiment extracts a plurality of line segments extending in the gravity direction from the image captured by the imaging unit 131 supported by the information acquisition device 130, and specifies the intersection of the line segments obtained by extending the plurality of line segments, thereby calculating the gravity direction vector c. Therefore, in the calibration according to the present embodiment, it is desirable to use an object having a portion extending in the gravity direction as a subject.

For example, in the example illustrated in FIG. 3, the thread-like objects M101a and M101b having fixed one ends and the other ends to which a weight is attached are used as subjects. By capturing an image of the objects M101a and M101b as subjects, the objects M101a and M101b in a state of being stretched to extend in the gravity direction by the weights are captured in the image.

The position and posture (in other words, the viewpoint) of the imaging unit 131 that captures the image of the objects M101a and M101b are desirably set such that the objects M101a and M101b captured as subjects in the image are not parallel to each other. Therefore, for example, in the example illustrated in FIG. 3, the position and posture (in other words, the viewpoint) of the imaging unit 131 that captures the image are desirably set such that an image in which the objects M101a and M101b are looked down from obliquely above is captured.

Figure 4:
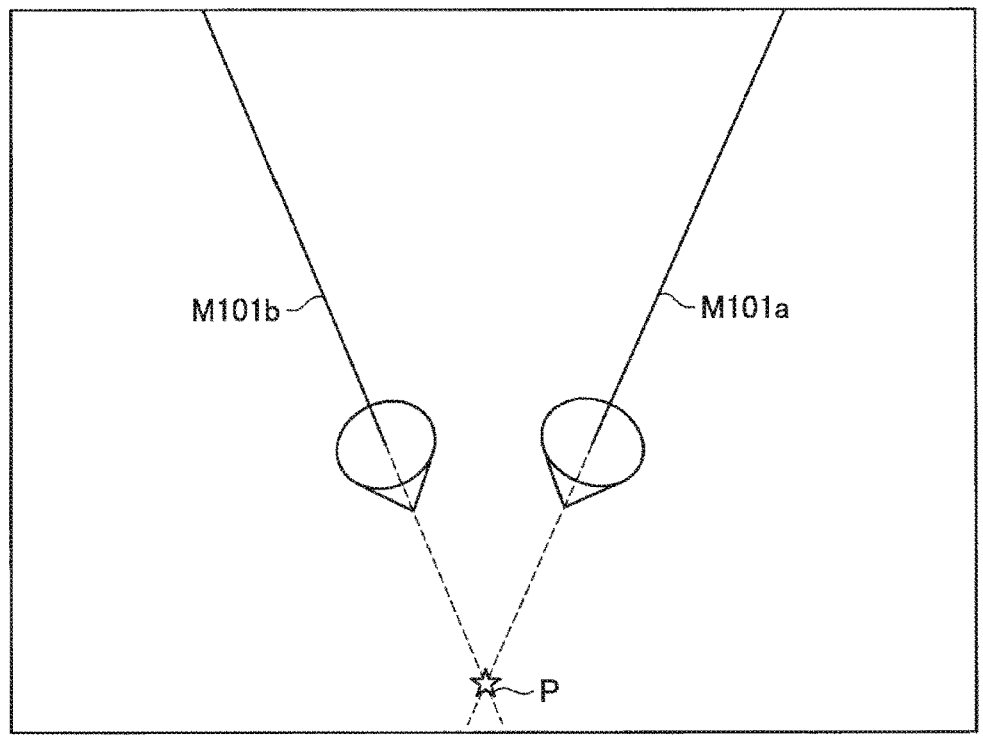
FIG. 4 is an explanatory diagram for describing an outline of the calibration according to the embodiment.

For example, FIG. 4 is an explanatory diagram for describing an outline of the calibration according to the present embodiment, and illustrates an example of an image in which the objects M101a and M101b illustrated in FIG. 3 are captured to be looked down from obliquely above. As illustrated in FIG. 4, in the case where the objects M101a and M101b are not parallel to each other in the image, portions obtained by extending the respective thread-like portions of the objects M101a and M101b intersect at part of a coordinate system of the image (that is, the local coordinate system of the imaging unit 131). For example, reference symbol P illustrated in FIG. 4 represents the intersection of the extended portions of the objects M101a and M101b.

Note that the objects M101a and M101b are held such that the thread-like portions extend in the gravity direction in a real space. That is, the direction in which the thread-like portions of the objects M101a and M101b extend on the image indicates the gravity direction in the coordinate system of the image. Furthermore, in the case of the example illustrated in FIG. 4, an intersection P of the portions obtained by extending the objects M101a and M101b captured as subjects in the coordinate system of the image corresponds to a vanishing point (infinite point) in the gravity direction (vertically downward direction).

The information processing device 100 according to the present embodiment calculates the gravity direction vector c in the local coordinate system of the imaging unit 131 on the basis of the subjects in the image captured by the imaging unit 131, by using the above-described characteristics.

Note that the method of extracting the thread-like portions (that is, the line segments extending in the gravity direction) of the objects M101a and M101b from the image captured by the imaging unit 131 is not particularly limited. For example, an image of a case where the objects M101a and M101b (especially, the thread-like portions extending in the gravity direction) are present in a capturing range and an image of a case where the objects M101a and M101b are not present are captured under the same exposure setting without moving the position and posture of the imaging unit 131 (that is, without moving the viewpoint), and the objects M101a and M101b may be extracted as a difference between the two images. Furthermore, as another example, the thread-like portions (that is, the line segments extending in the gravity direction) of the objects M101a and M101b may be extracted by extracting portions fit to a straight line from an image captured by two-dimensional Hough conversion. The above-description is mere examples, and the method is not particularly limited as long as a plurality of line segments extending in the gravity direction can be extracted from an image on the basis of a subject captured in the image.

Furthermore, in a case where the number of line segments extracted from an image for each viewpoint is three or more, all the straight lines obtained by respectively extending the plurality of extracted line segments may not intersect at one point due to an influence of observation errors or the like. In such a case, a point where a sum of distances to the respective straight lines becomes the smallest may be regarded as the above-mentioned intersection. Furthermore, the intersection of the straight lines obtained by respectively extending the plurality of line segments is not necessarily located in the image. That is, even in a case where the intersection is located outside the image, coordinates of the intersection in the local coordinate system of the imaging unit 131 are specified, whereby the gravity direction vector c can be calculated on the basis of a specification result of the intersection.

Here, the method of calculating the gravity direction vector c will be specifically described below. Note that, in the following description, for convenience, an optical axis direction of the imaging unit 131 is a z direction, and directions corresponding to a horizontal direction and a vertical direction of the captured image on an imaging plane of the imaging element of the imaging unit 131 are an x direction and a y direction, respectively, in the local coordinate system of the imaging unit 131. Furthermore, regarding the imaging unit 131, an internal parameter matrix K of the imaging unit 131 is expressed by (Expression 1) below, in a case where focal lengths in the x direction and the y direction are $f_x$ and $f_y$, respectively, and optical centers in the x direction and the y direction are $c_x$ and $c_y$, respectively.

[Math. 1]

$$K = \begin{bmatrix} f_x & 0 & c_x \\ 0 & f_y & c_y \\ 0 & 0 & 1 \end{bmatrix} \quad \text{(Expression 1)}$$

At this time, when a two-dimensional point (in other words, a point on the image) in a two-dimensional coordinate system (xy plane) on the image captured by the imaging unit 131 is $(p_x, p_y)$, the two-dimensional point can be converted into a three-dimensional vector $(v_x, v_y, v_z)$ in the real space on the basis of a calculation expression illustrated as (Expression 2) below.

[Math. 2]

$$\begin{bmatrix} v_x \\ v_y \\ v_z \end{bmatrix} = K^{-1} \begin{bmatrix} p_x \\ p_y \\ 1 \end{bmatrix} \quad \text{(Expression 2)}$$

That is, the information processing device 100 converts the coordinates in the two-dimensional coordinate system on the image captured by the imaging unit 131, of the intersection (for example, the intersection P illustrated in FIG. 4) of the plurality of line segments extending in the gravity direction extracted from the captured image by the imaging unit 131, into a three-dimensional vector on the basis of (Expression 1) and (Expression 2). The three-dimensional vector thus obtained corresponds to the gravity direction vector c in the real space.

Figure 5:
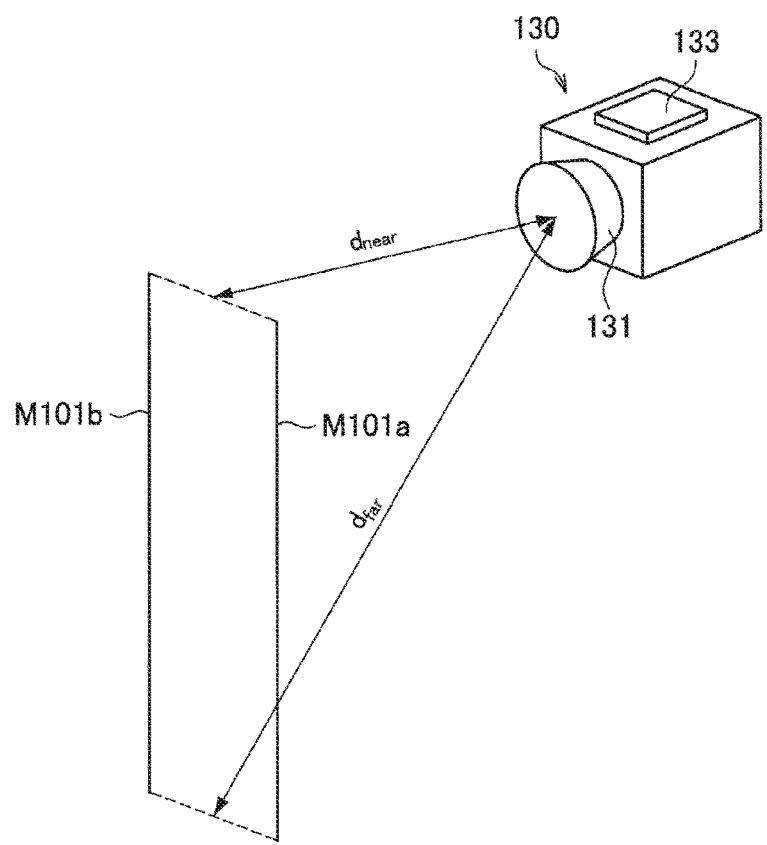
FIG. 5 is an explanatory diagram for describing an outline of the calibration according to the embodiment.

Note that, as described above, the information processing device 100 specifies the intersection of the plurality of line segments extracted from the image, thereby calculating the gravity direction vector c. Therefore, it is more desirable to set the viewpoint (in other words, the position and posture of the imaging unit 131) such that the intersection can be stably specified. Here, an example of setting conditions of the viewpoint at which the intersection (and thus the gravity direction vector c) can be more stably calculated will be described with reference to FIG. 5. FIG. 5 is an explanatory diagram for describing an outline of the calibration according to the present embodiment, and illustrates an example of setting conditions of the viewpoint at which the gravity direction vector c can be calculated in a more favorable mode.

In FIG. 5, reference numerals M101a and M101b schematically represent portions (line segments) extending in the gravity direction, of the objects M101a and M101b illustrated in FIGS. 3 and 4. Reference symbol $d_{near}$ schematically represents a distance between one of the ends of the objects M101a and M101b (line segments) along the gravity direction, the one end closer to the imaging unit 131, and the imaging unit 131. Furthermore, reference symbol $d_{far}$ schematically represents a distance between one of the ends of the objects M101a and M101b (line segments) along the gravity direction, the one end farther from the imaging unit 131, and the imaging unit 131. At this time, the viewpoint (in other words, the position and posture of the imaging unit 131, and thus the position and posture of the information acquisition device 130) is set such that the distances $d_{near}$ and $d_{far}$ satisfy the condition described as (Expression 3) below, so that the intersection (and thus the gravity direction vector c) can be more stably calculated.

[Math. 3]

$$d_{far} > 2d_{near} \quad \text{(Expression 3)}$$

(Calculation of Function R)

Next, an example of a method of calculating the function R for rotationally converting one coordinate system into the other coordinate system between the local coordinate system of the imaging unit 131 and the local coordinate system of the detection unit 133 will be described. As described above, the information processing device 100 according to the present embodiment calculates the function R on the basis of the gravity direction vector c and the gravitational acceleration vector a for each of the plurality of viewpoints. Note that the method of calculating the gravity direction vector c is as described above. Furthermore, the gravitational acceleration vector a can be acquired as the detection result of the acceleration (gravitational acceleration) by the detection unit 133, as described above. Here, in a case where the function R is a function for rotationally converting the local coordinate system of the detection unit 133 into the local coordinate system of the imaging unit 131, the relationship between a gravity direction vector $c_n$ and a gravitational acceleration vector $a_n$ at a certain viewpoint n is expressed as the relational expression as (Expression 4) below.

[Math. 4]

$$\frac{c_n}{|c_n|} = R \frac{a_n}{|a_n|} \quad \text{(Expression 4)}$$

The function R can be estimated by repeating the observation (for example, the observation described with reference to FIGS. 3 and 4) N times (N is an integer of 2 or larger) and searching for the function R that satisfies the relationship described in (Expression 4) the best. That is, the function R is calculated on the basis of the calculation expression described as (Expression 4) below. Note that it is assumed that influence of errors (for example, a distortion internal parameter of a lens or the like) caused by the imaging unit 131 itself, errors (for example, the bias and scale factor) caused by the detection unit 133 itself, and the like can be ignored by the calibration applied thereto in advance.

[Math. 5]

$$R = \underset{R}{\mathrm{argmin}} \sum_{n=1\ldots N} \left\{ \frac{c_n}{|c_n|} - R\frac{a_n}{|a_n|} \right\}$$

(Expression 5)

As described above, the function R is estimated by searching for the function R that satisfies the relationship described in (Expression 5) the best. It is desirable to set each viewpoint such that different results can be obtained as the gravity direction vector $c_n$ and the gravitational acceleration vector an among the plurality of viewpoints from the above characteristic. Specifically, it is favorable to set each viewpoint such that the position of the intersection specified from the image captured for each viewpoint (that is, the position in the local coordinate system of the imaging unit 131) is different between at least two or more viewpoints among the plurality of viewpoints.

An outline of the principle of the calibration according to the present embodiment has been described with reference to FIGS. 3 to 5.

<3.2. Calibration Processing Flow>

Figure 6:
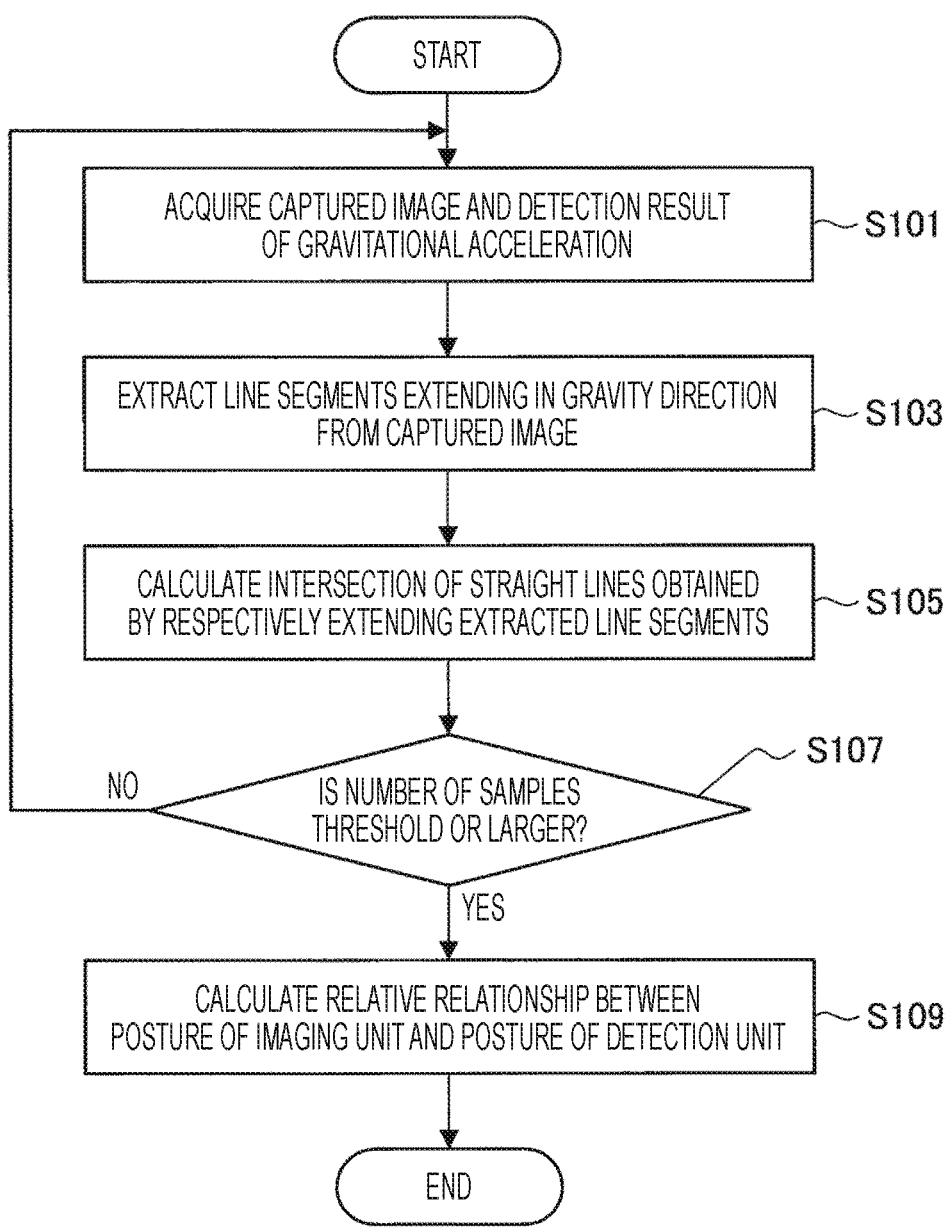
FIG. 6 is a flowchart illustrating an example of a flow of processing of the calibration according to the embodiment.

Next, an example of a flow of calibration processing according to the present embodiment will be described with reference to FIG. 6. FIG. 6 is a flowchart illustrating an example of a flow of processing of the calibration according to the present embodiment.

As illustrated in FIG. 6, the information processing device 100 (image processing unit 101) according to the present embodiment acquires the image captured by the imaging unit 131 supported by the information acquisition device 130 from the information acquisition device 130. Furthermore, the information processing device 100 (calculation unit 103) acquires the information according to the detection result of the gravitational acceleration by the detection unit 133 supported by the information acquisition device 130 from the information acquisition device 130 (S101).

The information processing device 100 (image processing unit 101) applies the analysis processing (image analysis) to the image captured for the each viewpoint, thereby extracting the plurality of line segments extending in the gravity direction from the image on the basis of a subject captured in the image (S103).

The information processing device 100 (image processing unit 101) specifies the intersection of the straight lines obtained by respectively extending the plurality of line segments in the image on the basis of the extraction result of the plurality of line segments from the image (S105).

The information processing device 100 continues the processing described in reference wharfs S101 to S105 until the number of samples of the above-described various types of information acquired for each viewpoint becomes a threshold or larger while changing the position and posture (that is, the viewpoint) of the information acquisition device 130 (S107, NO).

Then, in the case where the number of samples of the various types of information acquired for each viewpoint becomes the threshold or larger (S107, YES), the information processing device 100 (calculation unit 103) calculates the relative posture relationship between the imaging unit 131 and the detection unit 133 on the basis of the various types of information of the viewpoint (S109).

Specifically, the information processing device 100 (calculation unit 103) specifies the gravitational acceleration vector a in the local coordinate system of the detection unit 133 corresponding to the viewpoint according to the acceleration detection result by the detection unit 133 acquired for each of the plurality of viewpoints. Furthermore, the information processing device 100 (calculation unit 103) calculates, for the each of the plurality of viewpoints, the gravity direction vector c in the local coordinate system of the imaging unit 131 corresponding to the viewpoint on the basis of the specification result of the intersection of the plurality of line segments corresponding to the viewpoint. Then, the information processing device 100 (calculation unit 103) calculates the function R for converting one coordinate system into another coordinate system between the local coordinate system of the imaging unit 131 and the local coordinate system of the detection unit 133 on the basis of the gravitational acceleration vector a and the gravity direction vector c for each of the plurality of viewpoints.

An example of the flow of the calibration processing according to the present embodiment has been described with reference to FIG. 6.

4. MODIFICATION

Next, modifications of the information processing system 1 according to the present embodiment will be described.

<4.1. Modification 1: Example of Calibration Method>

First, as Modification 1, another example of the calibration method according to the present embodiment will be described especially focusing on a method of calculating the gravity direction vector c in the local coordinate system of the imaging unit 131 on the basis of a subject in the image captured by the imaging unit 131.

As described above, in the calibration according to the present embodiment, the plurality of line segments is extracted from the image on the basis of the subject captured in the image, and the intersection (vanishing point) of the straight lines obtained by respectively extending the plurality of line segments is specified. Then, the gravity vector c in the local coordinate system of the imaging unit 131 is calculated on the basis of the specification result of the intersection and the internal parameter of the imaging unit 131. Therefore, for example, in the example described with reference to FIGS. 3 to 5, the thread-like objects M101a and M101b having fixed one ends and the other ends to which a weight is attached are used as the subjects for extracting the plurality of line segments.

Meanwhile, the subject to be used for extracting the plurality of line segments is not particularly limited as long as the plurality of line segments extending in the gravity direction can be extracted on the basis of the subject captured in the image. For example, some structures such as buildings have an edge extending in the vertical direction (in other words, the gravity direction). Therefore, the intersection may be specified by using an object known to have a portion extending in the vertical direction (gravity direction) therein as a subject, and extracting the portion (for example, an edge) extending in the vertical direction from a captured image as the line segment.

Figure 7:
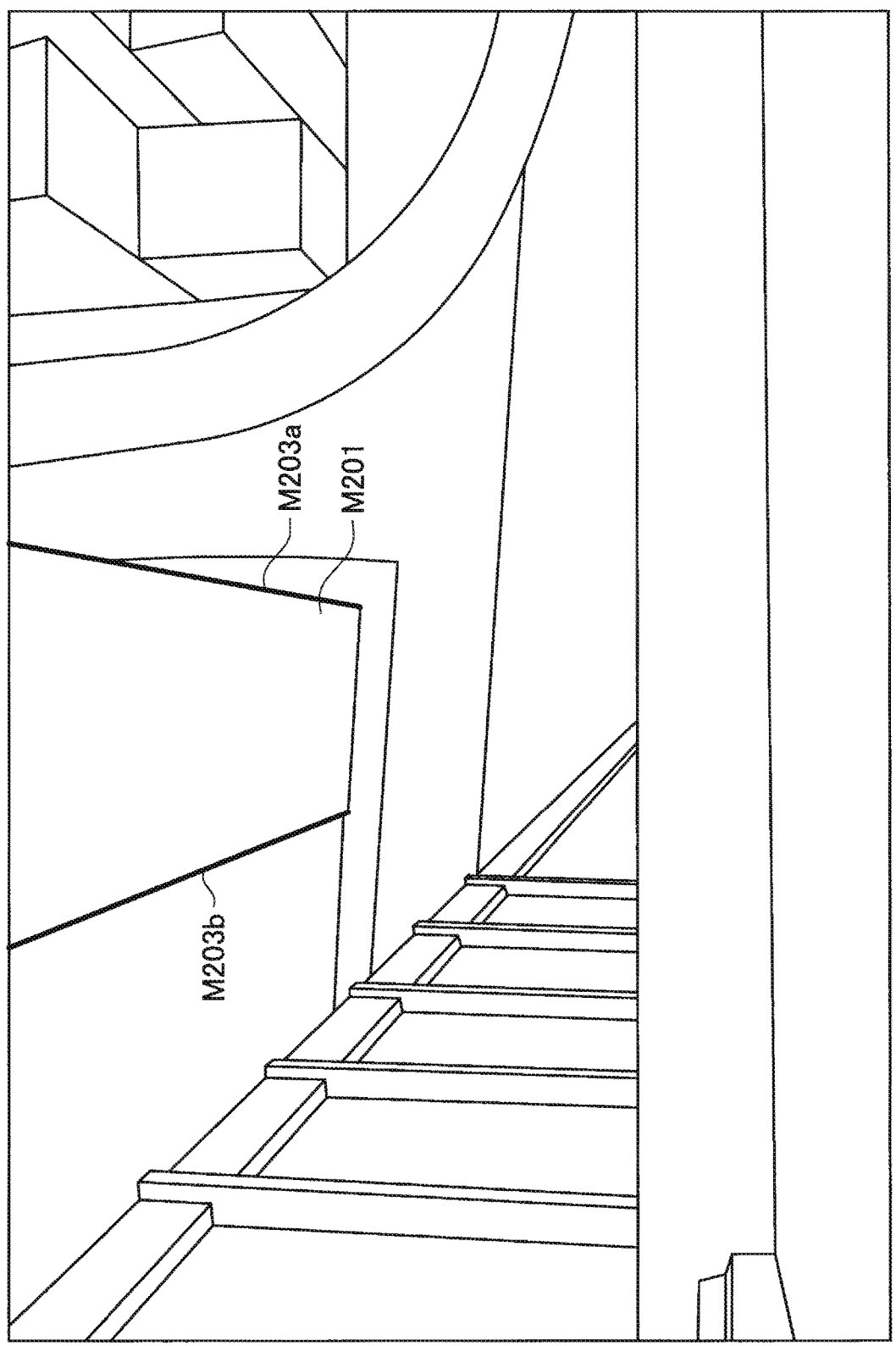
FIG. 7 is an explanatory diagram for describing an example of a calibration method according to Modification 1.

For example, FIG. 7 is an explanatory diagram for describing an example of a calibration method according to Modification 1, and illustrates an example of the case of using a structure such as building as a subject for extracting the plurality of line segments. Specifically, FIG. 7 illustrates an example of an image of a case where a building having an edge extending in the vertical direction is captured to be looked down from obliquely above. In the example illustrated in FIG. 7, an object (building) with reference numeral M201 is set as a subject, and portions respectively corresponding to edges M203a and M203b extending in the vertical direction, of portions of the object, are extracted as the line segments from the captured image. That is, an intersection of straight lines obtained by extending portions (line segments) respectively corresponding to the edges M203a and M203b in the image is specified, so that the gravity vector c in the local coordinate system of the imaging unit 131 can be calculated on the basis of the specification result of the intersection and the internal parameter of the imaging unit 131.

Figure 8:
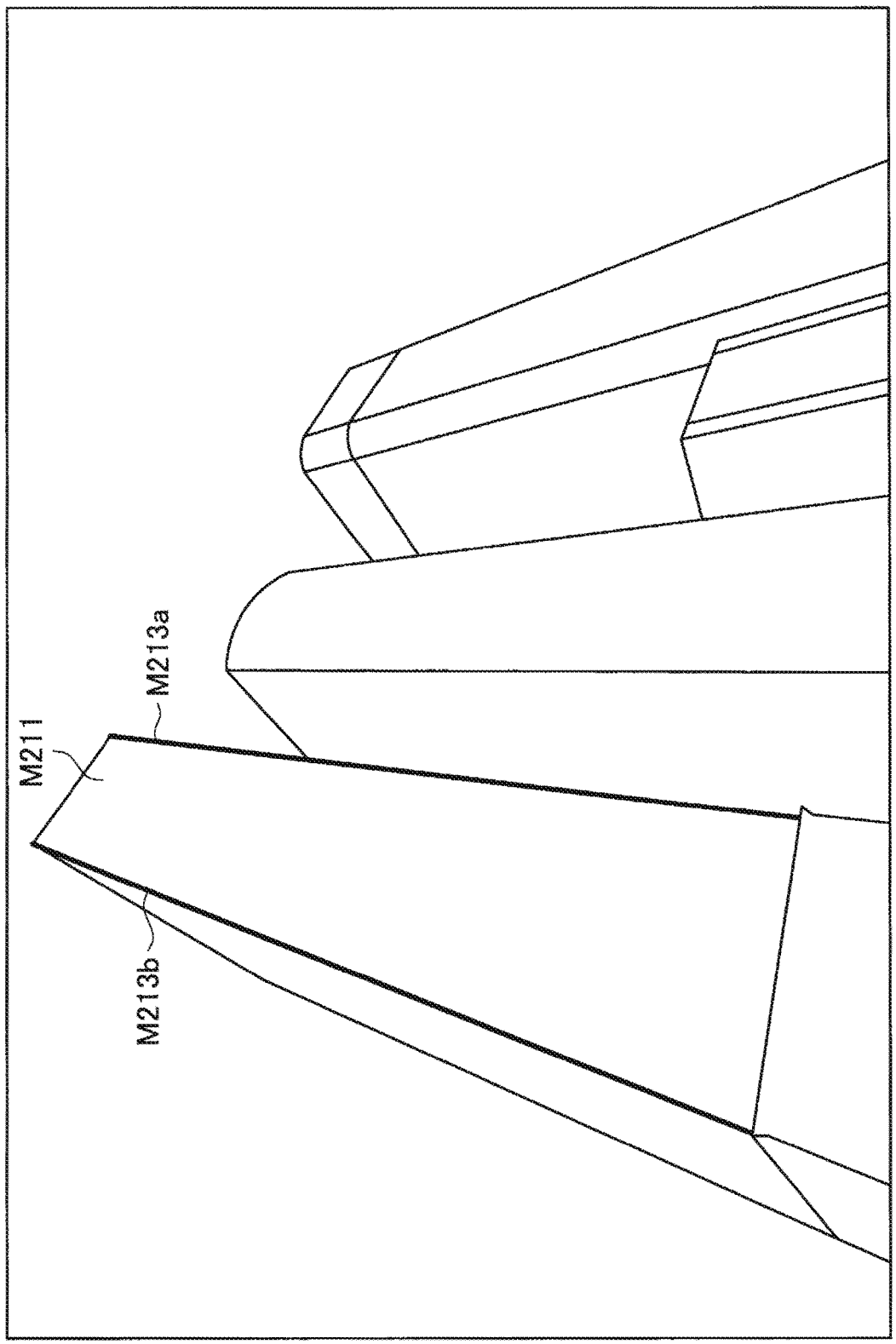
FIG. 8 is an explanatory diagram for describing another example of the calibration method according to Modification 1.

Furthermore, FIG. 8 is an explanatory diagram for describing another example of a calibration method according to Modification 1, and illustrates another example of the case of using a structure such as building as a subject for extracting the plurality of line segments. Specifically, FIG. 8 illustrates an example of an image of a case where a building having an edge extending in the vertical direction is captured to be looked up from obliquely below. In the example illustrated in FIG. 8, an object (building) with reference numeral M211 is set as a subject, and portions respectively corresponding to edges M213a and M213b extending in the vertical direction, of portions of the object, are extracted as the line segments from a captured image. That is, an intersection of straight lines obtained by extending portions (line segments) respectively corresponding to the edges M213a and M213b in the image is specified, so that the gravity vector c in the local coordinate system of the imaging unit 131 can be calculated on the basis of the specification result of the intersection and the internal parameter of the imaging unit 131. Note that the intersection specified in the example in FIG. 8 corresponds to a vanishing point (infinite point) in a direction (vertically upward direction) opposite to the gravity direction.

By performing the calibration by the method as described above, objects located in a surrounding area can be used for the calibration even if a subject is not prepared for the calibration, as in the example described with reference to FIGS. 3 to 5. Therefore, for example, in a case where the information acquisition device 130 is configured as a moving body, the information acquisition device 130 can perform the calibration in real time while recognizing the environment around the information acquisition device 130 by self-position estimation or the like.

Of course, the above-described example is a mere example, and does not limit the calibration method according to the present embodiment. For example, a subject may not include a linear portion as long as the subject captured in an image is analyzed and a plurality of line segments extending in the gravity direction can be extracted from the image. In other words, the subject may not include a linear portion as long as information indicating the gravity direction corresponding to the intersection can be extracted from the image. As a specific example, by setting an object held at a predetermined posture according to a direction in which the gravitational acceleration acts, as a subject, a vector (in other words, a line segment) extending in the gravity direction can be calculated in an image on the basis of the posture of the object captured in the image.

Furthermore, in the calibration according to the present embodiment, a common subject may not be captured in images respectively corresponding to a plurality of viewpoints. That is, the subjects used for extracting a plurality of line segments may be different from each other among the plurality of viewpoints as long as the plurality of line segments (or a plurality of straight lines) extending in the gravity direction (vertical direction) can be extracted from the respective images for the respective viewpoints. As a more specific example, the image illustrated in FIG. 7 may be used as an image captured from a certain viewpoint, and the image illustrated in FIG. 8 may be used as an image captured from another viewpoint different from the certain viewpoint. This also similarly applies to the examples described with reference to FIGS. 3 to 5.

As described above, as Modification 1, another example of the calibration method according to the present embodiment has been described focusing on a method of calculating the gravity direction vector c in the local coordinate system of the imaging unit 131 on the basis of a subject in the image captured by the imaging unit 131.

<4.2. Modification 2: Example of Calculation Method of Coordinate Conversion Function>

Next, as Modification 2, another example of the calibration method according to the present embodiment will be described especially focusing on a method of calculating the function R for performing conversion between the local coordinate system of the imaging unit 131 and the local coordinate system of the detection unit 133.

Specifically, regarding the function R described as (Expression 5), the errors (for example, the bias and scale factor) caused by the detection unit 133 itself is assumed to be calibrated in advance. In contrast, in Modification 2, an example of a method of estimating the bias and scale factor of (that is, a method of calibrating) the detection unit 133 in addition to the function R will be described.

First, a vector b representing the bias of the detection unit 133 is expressed by (Expression 6) below in a case where biases in the x direction, y direction, and z direction of the detection unit 133 in the local coordinate system of the detection unit 133 are $b_x$, $b_y$, and $b_z$, respectively.

[Math. 6]

$$b = \begin{bmatrix} b_x \\ b_y \\ b_z \end{bmatrix} \quad \text{(Expression 6)}$$

Furthermore, a matrix S representing the scale factor of the detection unit 133 is expressed by (Expression 7) below in a case where scale factors in the x direction, y direction, and z direction of the detection unit 133 in the local coordinate system of the detection unit 133 are $S_x$, $S_y$, and $S_z$, respectively.

[Math. 7]

$$S = \begin{bmatrix} s_x & 0 & 0 \\ 0 & s_y & 0 \\ 0 & 0 & s_z \end{bmatrix} \quad \text{(Expression 7)}$$

That is, the function R and the bias and scale factor of the detection unit 133 can be estimated by considering the vector b indicating the bias described as (Expression 6) and the matrix S indicating the scale factor described in (Expression 7) for the calculation expression of the function R described as (Expression 5). Specifically, the function R and the bias and scale factor of the detection unit 133 can be calculated on the basis of the calculation expression described as (Expression 8) below. g is the magnitude of the gravitational acceleration (9.8 (m/s²)).

[Math. 8]

$$R, b, S = \underset{R,b,S}{\mathrm{argmin}} \sum_{n=1...N} \left\{ g \frac{c_n}{|c_n|} - RS(a_n - b) \right\} \quad \text{(Expression 8)}$$

As described above, as Modification 2, another example of the calibration method according to the present embodiment has been described especially focusing on a method of calculating the function R for performing conversion between the local coordinate system of the imaging unit 131 and the local coordinate system of the detection unit 133.

<4.3. Modification 3: UI Example>

Next, as Modification 3, an example of a UI of the information processing system according to the present embodiment will be described. In the present modification, an example of a UI for guiding the user to set a viewpoint at which the function R can be more stably calculated will be described.

Specifically, as described above with reference to FIG. 5, the viewpoint (in other words, the position and posture of the imaging unit 131, and thus the position and posture of the information acquisition device 130) is set to satisfy the condition described as (Expression 3), so that the intersection (and thus the vanishing point) can be more stably specified. Furthermore, it is favorable to set each viewpoint such that the position of the intersection specified from the image captured for each viewpoint (that is, the position in the local coordinate system of the imaging unit 131) is different between at least two or more viewpoints among the plurality of viewpoints.

Therefore, hereinafter, an example of a UI for guiding the user such that the information acquisition device 130 is held at the position and posture that satisfy the above conditions (that is, a more favorable viewpoint can be set) will be described. Note that, in the present modification, calibration is performed using the thread-like objects M101a and M101b having fixed one ends and the other ends to which a weight is attached as subjects, as described with reference to FIGS. 3 to 5, for convenience.

Figure 9:
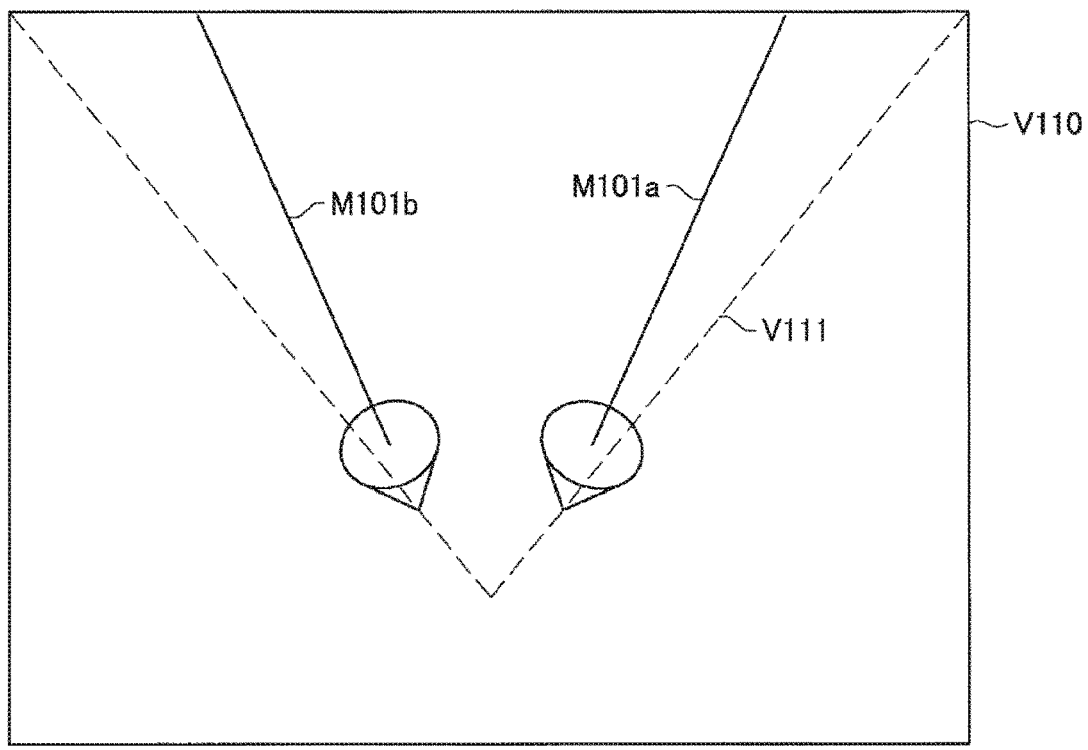
FIG. 9 is an explanatory diagram for describing an outline of an information processing system according to Modification 3.

For example, FIG. 9 is an explanatory diagram for describing an outline of the information processing system according to Modification 3, and illustrates an example of a UI for guiding the user to set a more favorable viewpoint. Specifically, FIG. 9 illustrates an example of a UI for guiding the user to set a viewpoint that satisfies the condition described as (Expression 3).

Specifically, in the example illustrated in FIG. 9, a guide V111 for guiding the position and posture of the information acquisition device 130 to satisfy the condition described as (Expression 3) is superimposed on an image V110 (for example, a through image) captured by the imaging unit 131. In this case, the position and posture satisfy the condition described as (Expression 3) when the user adjusts the position and posture of the information acquisition device 130 such that thread-like portions (that is, the portions extending in the gravity direction) of the objects M101a and M101b go along the guide V111.

Furthermore, in a case of setting each of a plurality of viewpoints, presentation of the guide V111 may be controlled such that the position of a portion corresponding to the intersection of the guide V111 in the image becomes different for each set viewpoint. Each of the plurality of viewpoints is set to obtain a different result as the gravity direction vector $c_n$ and the gravitational acceleration vector $a_n$ among the plurality of viewpoints by the user being guided by such control.

Figure 10:
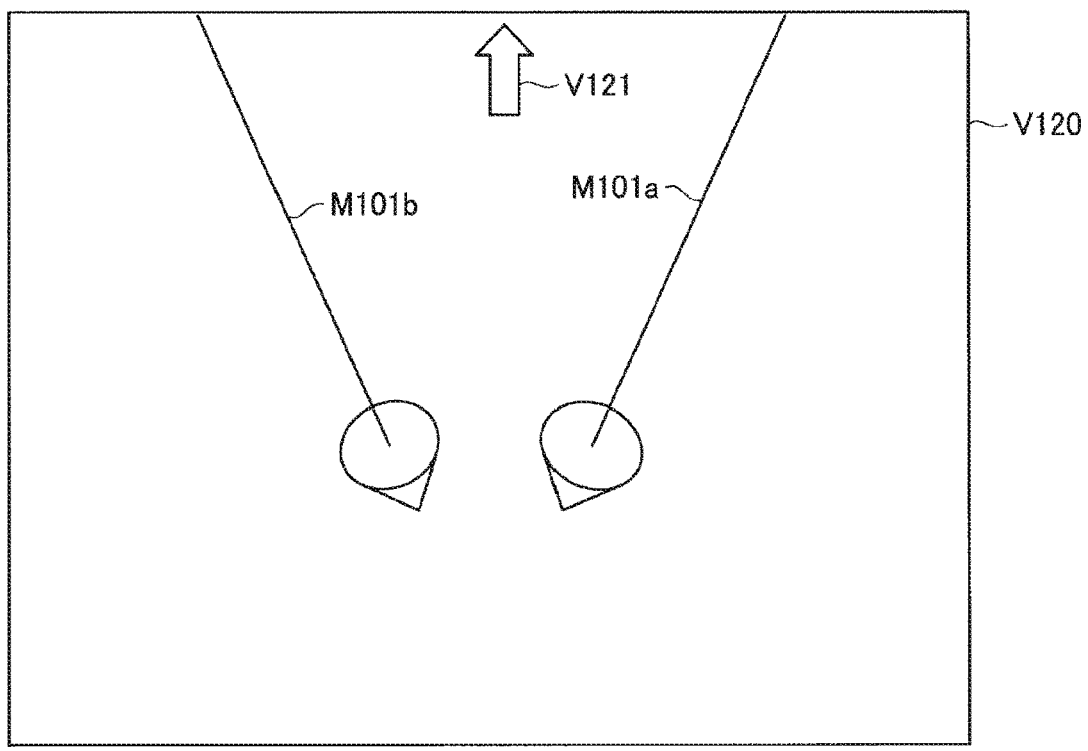
FIG. 10 is an explanatory diagram for describing an outline of the information processing system according to Modification 3.

Furthermore, FIG. 10 is an explanatory diagram for describing an outline of the information processing system according to Modification 3, and illustrates another example of the UI for guiding the user to set a more favorable viewpoint. Specifically, FIG. 10 illustrates an example of the UI for guiding the user to set a viewpoint in a more favorable mode, by presenting a direction in which the position and posture of the information acquisition device 130 are changed to the user.

Specifically, in the example illustrated in FIG. 10, display information V121 indicating the direction in which the position and posture of the information acquisition device 130 are changed is superimposed on an image V120 (for example, a through image) captured by the imaging unit 131. In this case, the user changes the position and posture of the information acquisition device 130 along with the guidance of the display information V121, so that the viewpoint is set in a more favorable manner.

Note that the examples illustrated in FIGS. 9 and 10 are mere examples, and the UI for the guidance is not particularly limited as long as the UI can perform guidance such that the viewpoints are set in a more favorable mode. Furthermore, an example of visually guiding the user by the display information has been described with reference to FIGS. 9 and 10. However, the guiding method is not necessarily limited. As a specific example, the user may be guided by presentation of sound or force sense.

As Modification 3, an example of the UI of the information processing system according to the present embodiment has been described. In the present modification, an example of the UI for guiding the user to set a viewpoint at which the function R can be more stably calculated has been described.

5. HARDWARE CONFIGURATION

Figure 11:
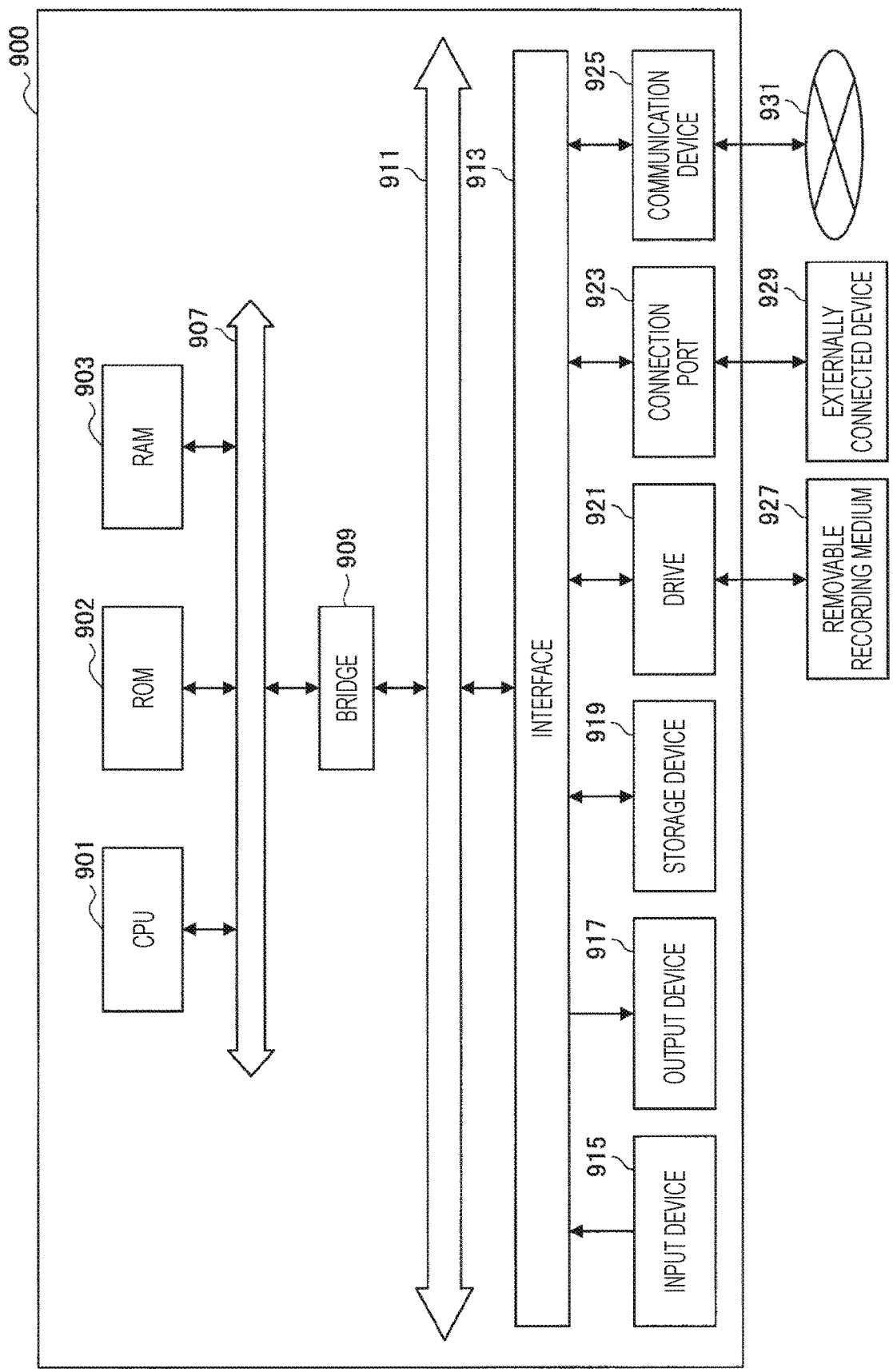
FIG. 11 is a functional block diagram illustrating an example of a hardware configuration of an information processing device configuring an information processing system according to an embodiment of the present disclosure.

Next, an example of a hardware configuration of an information processing device 900 configuring the information processing system according to the present embodiment, as in the above-described information processing device 100, will be described with reference to FIG. 11. FIG. 11 is a functional block diagram illustrating an example of a hardware configuration of an information processing device 900 configuring an information processing system according to an embodiment of the present disclosure.

An information processing device 900 configuring the information processing system 1 according to the present embodiment mainly includes a CPU 901, a ROM 902, and a RAM 903. Furthermore, the information processing device 900 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control device, and controls the entire operation or part thereof of the information processing device 900 according to various programs recorded in the ROM 902, the RAM 903, the storage device 919, or a removable recording medium 927. The ROM 902 stores programs, arithmetic operation parameters, and the like used by the CPU 901. The RAM 903 primarily stores the programs used by the CPU

901, parameters that appropriately change in execution of the programs, and the like. The CPU 901, the ROM 902, and the RAM 903 are mutually connected by the host bus 907 configured by an internal bus such as a CPU bus. Note that the image processing unit 101, the calculation unit 103, and the input/output control unit 105 described with reference to FIG. 2 can be implemented by the CPU 901, for example.

The host bus 907 is connected to the external bus 911 such as a peripheral component interconnect/interface (PCI) bus via the bridge 909. Furthermore, the input device 915, the output device 917, the storage device 919, the drive 921, the connection port 923, and the communication device 925 are connected to the external bus 911 via the interface 913.

The input device 915 is an operation unit operated by the user, such as a mouse, a keyboard, a touch panel, a button, a switch, a lever, and a pedal, for example. Furthermore, the input device 915 may be, for example, a remote control unit (so-called remote controller) using infrared rays or other radio waves or an externally connected device 929 such as a mobile phone or a PDA corresponding to an operation of the information processing device 900. Moreover, the input device 915 is configured by, for example, an input control circuit for generating an input signal on the basis of information input by the user using the above-described operation unit and outputting the input signal to the CPU 901, or the like. The user of the information processing device 900 can input various data and give an instruction on processing operations to the information processing device 900 by operating the input device 915. Note that the input unit 153 described with reference to FIG. 2 can be implemented by the input device 915, for example.

The output device 917 is configured by a device that can visually or audibly notify the user of acquired information. Such devices include display devices such as a CRT display device, a liquid crystal display device, a plasma display device, an EL display device, a lamp, and the like, sound output devices such as a speaker and a headphone, and a printer device. The output device 917 outputs, for example, results obtained by various types of processing performed by the information processing device 900. Specifically, the display device displays the results of the various types of processing performed by the information processing device 900 as texts or images. Meanwhile, the sound output device converts an audio signal including reproduced sound data, voice data, or the like into an analog signal and outputs the analog signal. Note that the output unit 155 described with reference to FIG. 2 can be implemented by the output device 917, for example.

The storage device 919 is a device for data storage configured as an example of a storage unit of the information processing device 900. The storage device 919 is configured by a magnetic storage device such as a hard disk drive (HDD), a semiconductor storage device, an optical storage device, a magneto-optical storage device, or the like, for example. The storage device 919 stores programs executed by the CPU 901, various data, and the like.

The drive 921 is a reader/writer for a recording medium, and is built in or is externally attached to the information processing device 900. The drive 921 reads out information recorded on the removable recording medium 927 such as a mounted magnetic disk, optical disk, magneto-optical disk, or semiconductor memory, and outputs the information to the RAM 903. Furthermore, the drive 921 can also write a record on the removable recording medium 927 such as the mounted magnetic disk, optical disk, magneto-optical disk, or semiconductor memory. The removable recording medium 927 is, for example, a DVD medium, an HD-DVD medium, a Blu-ray (registered trademark) medium, or the like. Furthermore, the removable recording medium 927 may be a compact flash (CF (registered trademark)), a flash memory, a secure digital (SD) memory card, or the like. Furthermore, the removable recording medium 927 may be, for example, an integrated circuit (IC) card on which a non-contact IC chip is mounted, an electronic device, or the like. Note that the storage unit 151 described with reference to FIG. 2 can be implemented by at least either the RAM 903 or the storage device 919, for example.

The connection port 923 is a port for being directly connected to the information processing device 900. Examples of the connection port 923 include a universal serial bus (USB) port, an IEEE 1394 port, a small computer system interface (SCSI) port, and the like. Other examples of the connection port 923 include an RS-232C port, an optical audio terminal, a high-definition multimedia interface (HDMI) (registered trademark) port, and the like. By connecting the externally connected device 929 to the connection port 923, the information processing device 900 directly acquires various data from the externally connected device 929 and provides various data to the externally connected device 929.

The communication device 925 is, for example, a communication interface configured by a communication device for being connected to a communication network (network) 931, and the like The communication device 925 is, for example, a communication card for a wired or wireless local area network (LAN), Bluetooth (registered trademark), a wireless USB (WUSB), or the like. Furthermore, the communication device 925 may be a router for optical communication, a router for an asymmetric digital subscriber line (ADSL), a modem for various communications, or the like. The communication device 925 can transmit and receive signals and the like, for example, to and from the Internet and other communication devices in accordance with a predetermined protocol such as TCP/IP, for example. Furthermore, a communication network 931 connected to the communication device 925 is configured by a network or the like connected by wire or wirelessly, and may be, for example, the Internet, home LAN, infrared communication, radio wave communication, satellite communication, or the like.

An example of the hardware configuration which can implement the functions of the information processing device 900 configuring the information processing system 1 according to the embodiment of the present disclosure has been described. Each of the above-described configuration elements may be configured using general-purpose members or may be configured by hardware specialized for the function of each configuration element. Therefore, the hardware configuration to be used can be changed as appropriate according to the technical level of the time of carrying out the present embodiment. Note that, although not illustrated in FIG. 11, various configurations corresponding to the information processing device 900 configuring the information processing system 1 according to the present embodiment are naturally provided.

Note that a computer program for realizing the functions of the information processing device 900 configuring the information processing system 1 according to the above-described present embodiment can be prepared and implemented on a personal computer or the like. Furthermore, a computer-readable recording medium in which such a computer program is stored can be provided. The recording medium is, for example, a magnetic disk, an optical disk, a magneto-optical disk, a flash memory, or the like. Furthermore, the above computer program may be delivered via, for example, a network without using a recording medium. Furthermore, the number of computers that execute the computer program is not particularly limited. For example, a plurality of computers (for example, a plurality of servers or the like) may execute the computer program in cooperation with one another. Note that a single computer or a plurality of computers cooperating with one another is also referred to as a "computer system".

6. APPLICATION

Next, in the information processing system according to the embodiment of the present disclosure, an example of the information acquisition device 130 to be calibrated will be described.

The technology regarding calibration by the information processing device 100 according to the present embodiment can be applied to a device in which the imaging unit 131 and the detection unit 133 are integrally supported. At this time, the imaging unit 131 and the detection unit 133 may be configured such that one unit is attachable to and detachable from the other unit. That is, the technology regarding calibration can be applied to a device configured such that one unit is held with respect to the other unit so as to temporarily fix at least the relative posture relationship between the imaging unit 131 and the detection unit 133 (for example, fix the relative posture relationship at the time of acquiring the information for calibration). Examples of such a device include a device that is configured to be portable, a device assumed to be carried by a user during use, and the like. More specific examples include a communication terminal such as a smartphone, and a wearable device used by being worn on a part of the user's body. Furthermore, in recent years, some controllers and the like used by the user who holds a housing thereof are provided with configurations corresponding to the imaging unit 131 and the detection unit 133 in order to implement gesture input and the like. The technology regarding calibration can also be applied to such controllers. Furthermore, other examples of the device to which the technology regarding calibration include a movable body such as a vehicle or a drone, and a movably configured device such as a so-called autonomous robot.

Figure 12:
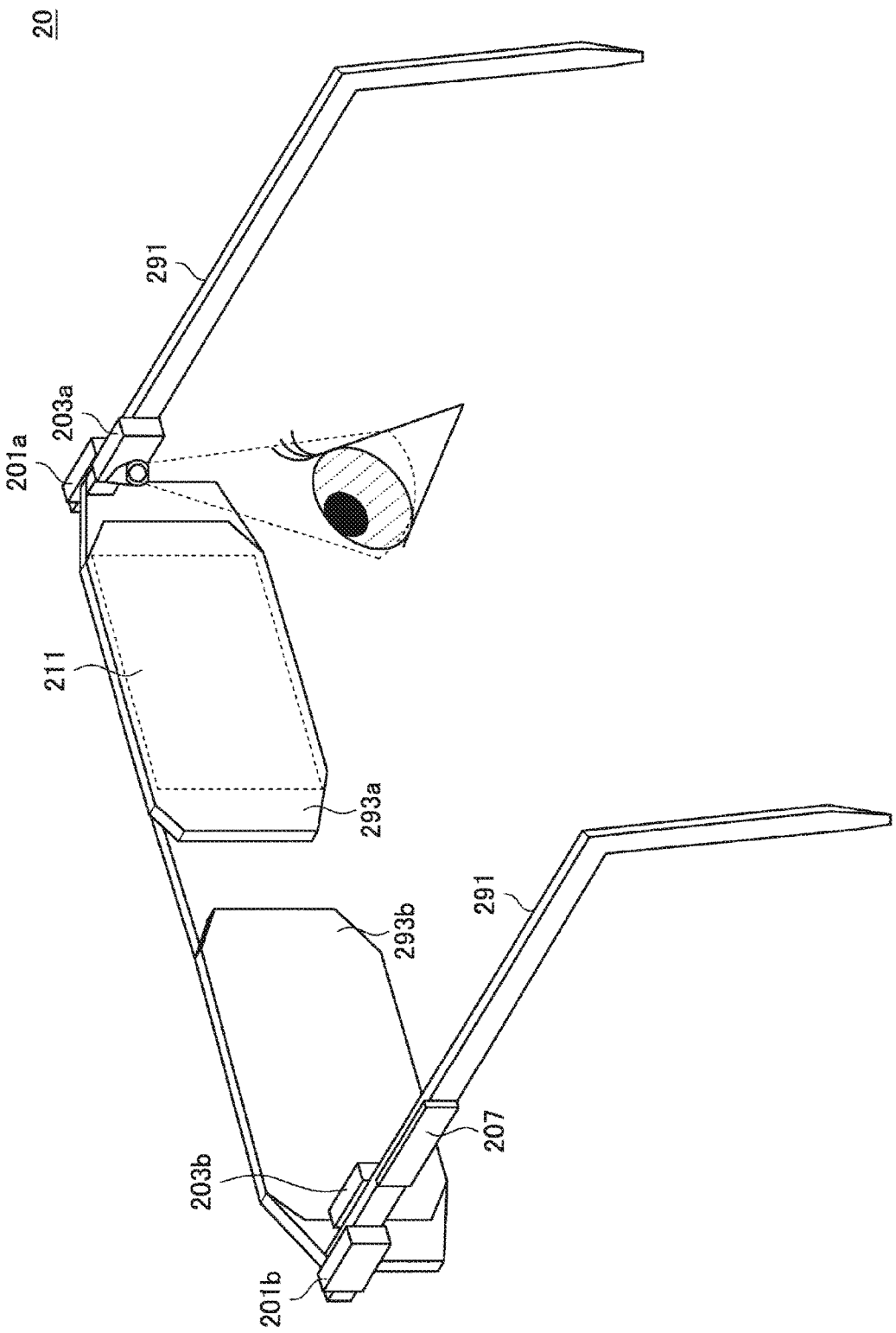
FIG. 12 is an explanatory diagram for describing an application of the embodiment of the present disclosure.

Here, as an example of the device to which the technology regarding calibration is applicable, an example of a specific configuration of a so-called head-mounted device such as a head mounted display (HMD) used for implementing augmented reality (AR) or virtual reality (VR) will be described. For example, FIG. 12 is an explanatory diagram for describing an application of an embodiment of the present disclosure, and illustrates an example of a configuration of an input/output device 20 that can be calibrated by the information processing device 100.

The input/output device 20 is configured as a so-called head-mounted device worn on at least part of the head of the user and used by the user. For example, in the example illustrated in FIG. 12, the input/output device 20 is configured as a so-called eyewear-type (glasses-type) device, and at least either a lens 293a or a lens 293b is configured as a transmission-type display (display unit 211). Furthermore, the input/output device 20 includes first imaging units 201a and 201b, second imaging units 203a and 203b, an operation unit 207, and a holding unit 291 corresponding to a frame of the glasses. The holding unit 291 holds the display unit 211, the first imaging units 201a and 201b, the second imaging units 203a and 203b, and the operation unit 207 to have a predetermined positional relationship with respect to the head of the user when the input/output device 20 is mounted on the head of the user. Furthermore, although not illustrated in FIG. 12, the input/output device 20 may be provided with a sound collection unit for collecting a voice of the user.

Here, a more specific configuration of the input/output device 20 will be described. For example, in the example illustrated in FIG. 12, the lens 293a corresponds to a lens on a right eye side, and the lens 293b corresponds to a lens on a left eye side. In other words, the holding unit 291 holds the display unit 211 such that the display unit 211 (in other words, the lenses 293a and 293b) is located in front of the eyes of the user in the case where the input/output device 20 is mounted.

The first imaging units 201a and 201b are configured as so-called stereo cameras and are held by the holding unit 291 to face a direction in which the head of the user faces (in other words, the front of the user) when the input/output device 20 is mounted on the head of the user. At this time, the first imaging unit 201a is held near the user's right eye, and the first imaging unit 201b is held near the user's left eye. The first imaging units 201a and 201b capture a subject located in front of the input/output device 20 (in other words, a real object located in a real space) from different positions on the basis of such a configuration. Thereby, the input/output device 20 acquires images of the subject located in front of the user and can calculate a distance to the subject from the input/output device 20 on the basis of a parallax between the images respectively captured by the first imaging units 201a and 201b.

Note that the configuration and method are not particularly limited as long as the distance between the input/output device 20 and the subject can be measured. As a specific example, the distance between the input/output device 20 and the subject may be measured on the basis of a method such as multi-camera stereo, moving parallax, time of flight (TOF), or structured light. Here, the TOF is a method of obtaining an image (so-called distance image) including a distance (depth) to a subject on the basis of a measurement result by projecting light such as infrared light on the subject and measuring a time required for the projected light to be reflected by the subject and return, for each pixel. Furthermore, the structured light is a method of obtaining a distance image including a distance (depth) to a subject on the basis of change in a pattern obtained from a capture result by irradiating the subject with the pattern of light such as infrared light and capturing the pattern. Furthermore, the moving parallax is a method of measuring a distance to a subject on the basis of a parallax even in a so-called monocular camera. Specifically, the subject is captured from different viewpoints from each other by moving the camera, and the distance to the subject is measured on the basis of the parallax between the captured images. Note that, at this time, the distance to be subject can be measured with more accuracy by recognizing a moving distance and a moving direction of the camera using various sensors. Note that the configuration of the imaging unit (for example, the monocular camera, the stereo camera, or the like) may be changed according to the distance measuring method.

Furthermore, the second imaging units 203a and 203b are held by the holding unit 291 such that eyeballs of the user are located within respective imaging ranges when the input/output device 20 is mounted on the head of the user. As a specific example, the second imaging unit 203a is held such that the user's right eye is located within the imaging range. The direction in which the line-of-sight of the right eye is directed can be recognized on the basis of an image of the eyeball of the right eye captured by the second imaging unit 203a and a positional relationship between the second imaging unit 203a and the right eye, on the basis of such a configuration. Similarly, the second imaging unit 203b is held such that the user's left eye is located within the imaging range. In other words, the direction in which the line-of-sight of the left eye is directed can be recognized on the basis of an image of the eyeball of the left eye captured by the second imaging unit 203b and a positional relationship between the second imaging unit 203b and the left eye. Note that the example in FIG. 12 illustrates the configuration in which the input/output device 20 includes both the second imaging units 203a and 203b. However, only one of the second imaging units 203a and 203b may be provided.

The operation unit 207 is configured to receive an operation on the input/output device 20 from the user. The operation unit 207 may be configured by, for example, an input device such as a touch panel or a button. The operation unit 207 is held at a predetermined position of the input/output device 20 by the holding unit 291. For example, in the example illustrated in FIG. 12, the operation unit 207 is held at a position corresponding to a temple of the glasses.

Furthermore, the input/output device 20 may be provided with, for example, an acceleration sensor and an angular velocity sensor (gyro sensor) and configured to be able to detect a motion of the head (in other words, a posture of the input/output device 20 itself) of the user wearing the input/output device 20. As a specific example, the input/output device 20 may detect components in a yaw direction, a pitch direction, and a roll direction as the motion of the head of the user, thereby recognizing a change in at least either the position or posture of the head of the user.

The input/output device 20 may recognize changes in its own position and posture in the real space according to the motion of the head of the user on the basis of the above configuration, for example. Furthermore, at this time, the input/output device 20 may present the virtual content (in other words, the virtual object) on the display unit 211 to superimpose the virtual content on the real object located in the real space on the basis of the so-called AR technology. To implement such control, the above-described technology according to the present embodiment (that is, the technology regarding calibration) can be applied to, for example, calibration for a relative relationship between postures of the first imaging units 201a and 201b and postures of the acceleration sensor and the angular velocity sensor described above.

Note that examples of a head mounted display (HMD) device applicable as the input/output device 20 include a see-through HMD, a video see-through HMD, and a retinal projection HMD, in the case of assuming application of the AR technology.

The see-through HMD uses, for example, a half mirror or a transparent light guide plate to hold a virtual image optical system including a transparent light guide or the like in front of the eyes of the user, and displays an image inside the virtual image optical system. Therefore, the user wearing the see-through HMD can take the external scenery into view while viewing the image displayed inside the virtual image optical system. With such a configuration, the see-through HMD can superimpose an image of the virtual object on an optical image of the real object located in the real space according to the recognition result of at least one of the position or posture of the see-through HMD on the basis of the AR technology, for example. Note that a specific example of the see-through HMD includes a so-called glasses-type wearable device in which a portion corresponding to a lens of glasses is configured as a virtual image optical system. For example, the input/output device 20 illustrated in FIG. 12 corresponds to an example of the see-through HMD.

In a case where the video see-through HMD is mounted on the head or face of the user, the video see-through HMD is mounted to cover the eyes of the user, and a display unit such as a display is held in front of the eyes of the user. Furthermore, the video see-through HMD includes an imaging unit for capturing surrounding scenery, and causes the display unit to display an image of the scenery in front of the user captured by the imaging unit. With such a configuration, the user wearing the video see-through HMD has a difficulty in directly taking the external scenery into view but the user can confirm the external scenery with the image displayed on the display unit. Furthermore, at this time, the video see-through HMD may superimpose the virtual object on an image of the external scenery according to the recognition result of at least one of the position or posture of the video see-through HMD on the basis of the AR technology, for example.

The retinal projection HMD has a projection unit held in front of the eyes of the user, and an image is projected from the projection unit toward the eyes of the user such that the image is superimposed on the external scenery. More specifically, in the retinal projection HMD, an image is directly projected from the projection unit onto the retinas of the eyes of the user, and the image is imaged on the retinas. With such a configuration, the user can view a clearer image even in a case where the user has myopia or hyperopia. Furthermore, the user wearing the retinal projection HMD can take the external scenery into view even while viewing the image projected from the projection unit. With such a configuration, the retinal projection HMD can superimpose an image of the virtual object on an optical image of the real object located in the real space according to the recognition result of at least one of the position or posture of the retinal projection HMD on the basis of the AR technology, for example.

Furthermore, an HMD called an immersive HMD can be applied assuming application of the VR technology, in addition to the above-described examples. The immersive HMD is mounted to cover the eyes of the user, and a display unit such as a display is held in front of the eyes of the user, similarly to the video see-through HMD. Therefore, the user wearing the immersive HMD has a difficulty in directly taking an external scenery (in other words, scenery of a real world) into view, and only an image displayed on the display unit comes into view. With such a configuration, the immersive HMD can provide an immersive feeling to the user who is viewing the image.

The examples of the configurations of the head-mounted device used to implement AR or VR have been described with reference to FIG. 12, as examples of the device to which the technology regarding calibration is applicable.

7. CONCLUSION

As described above, the information processing device according to an embodiment of the present disclosure acquires an image captured by an imaging unit and a detection result of gravitational acceleration by a detection unit supported by the imaging unit, for each of a plurality of viewpoints different from each other. Furthermore, the information processing device extracts a plurality of line segments extending in the gravity direction from the image and specifies an intersection of straight lines obtained by respectively extending the plurality of line segments, on the basis of a subject captured in the image of the each viewpoint. Then, the information processing device calculates a relative posture relationship between the imaging unit and the detection unit on the basis of the detection result of the gravitational acceleration acquired for each of the plurality of viewpoints and the intersection specified for the each of the plurality of viewpoints. As a specific example, the information processing device calculates the function R for converting the posture in one coordinate system into the posture in the other coordinate system between the first coordinate system associated with the imaging unit and the second coordinate system associated with the detection unit.

With the above configuration, the correspondence (calibration) between the posture of the imaging unit and the posture of the detection unit, to which the errors related to attachment of the imaging unit and the detection unit are added, can be implemented with a smaller calculation amount. Furthermore, according to the technology of the present disclosure, the above correspondence can be implemented by simple facility and simple procedures without requiring special facility and complicated procedures. As described above, according to the information processing device of the embodiment of the present disclosure, the correspondence between the posture of the imaging unit and the posture of the detection unit (in other words, the coordinate conversion between the imaging unit and the detection unit) can be implemented in a more favorable mode. Thereby, the recognition technology using the analysis result of the captured image by the imaging unit and the detection result by the detection unit can be implemented in a more favorable mode. Therefore, for example, a more accurate viewpoint change with small superimposition deviation can be reproduced in implementing AR or VR.

Although the favorable embodiment of the present disclosure has been described in detail with reference to the accompanying drawings, the technical scope of the present disclosure is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that following configurations also belong to the technical scope of the present disclosure.

(1) An information processing device including:
an acquisition unit configured to acquire an image captured by an imaging unit and a detection result of a gravitational acceleration by a detection unit supported by the imaging unit, for each of a plurality of viewpoints different from one another;
an image processing unit configured to extract a plurality of line segments extending in a gravity direction from the image and specify an intersection of straight lines obtained by respectively extending the plurality of line segments on the basis of a subject captured in the image for the each viewpoint; and
a calculation unit configured to calculate a relative posture relationship between the imaging unit and the detection unit on the basis of the detection result of the gravitational acceleration acquired for each of the plurality of viewpoints and the intersection specified for each of the plurality of viewpoints.

(2) The information processing device according to (1), in which the calculation unit makes a first coordinate system associated with the imaging unit and a second coordinate system associated with the detection unit correspond to each other on the basis of the detection result of the gravitational acceleration acquired for the each viewpoint and a specification result of the intersection for the each viewpoint.

(3) The information processing device according to (2), in which
the calculation unit
calculates a vector in the gravity direction in the first coordinate system at the viewpoint on the basis of the specification result of the intersection for the each viewpoint, and
makes the first coordinate system and the second coordinate system correspond to each other on the basis of the detection result of the gravitational acceleration acquired for each of the plurality of viewpoints and the vector in the gravity direction calculated for the each of the plurality of viewpoints.

(4) The information processing device according to (3), in which the calculation unit calculates a function for converting a posture in one coordinate system into a posture in another coordinate system between the first coordinate system and the second coordinate system on the basis of the vector in the gravity direction in the first coordinate system and a vector according to the gravitational acceleration in the second coordinate system.

(5) The information processing device according to any one of (1) to (4), in which the image processing unit extracts at least part of the plurality of line segments on the basis of a posture of an object held at the posture according to gravity, the object being captured as the subject in the image for the each viewpoint.

(6) The information processing device according to (5), in which the image processing unit extracts the line segment on the basis of the posture of the object, for each of a plurality of the objects captured as the subject in the image for the each viewpoint.

(7) The information processing device according to (6), in which at least part of the plurality of objects is a thread-like object with a fixed one end.

(8) The information processing device according to any one of (1) to (4), in which the image processing unit extracts at least part of the plurality of line segments on the basis of an edge extending in the gravity direction of an object captured as the subject in the image for the each viewpoint.

(9) The information processing device according to (8), in which the object is a building having the edge extending in the gravity direction in at least part of the building.

(10) The information processing device according to any one of (1) to (9), in which at least two or more viewpoints included in the plurality of viewpoints are set such that positions of the intersections in the coordinate system associated with the imaging unit are different from each other, the intersections being specified from the images captured by the imaging unit from the viewpoints.

(11) The information processing device according to any one of (1) to (10), further including: an output control unit configured to cause an output unit to output information for guiding movement of a position of the viewpoint such that, in at least two or more viewpoints of the plurality of viewpoints, positions of the intersections in the coordinate system associated with the imaging unit are different from each other, the intersections being specified from the images captured by the imaging unit from the viewpoints.

(12) An information processing method, by a computer, including:

acquiring an image captured by an imaging unit and a detection result of a gravitational acceleration by a detection unit supported by the imaging unit, for each of a plurality of viewpoints different from one another;

extracting a plurality of line segments extending in a gravity direction from the image and specify an intersection of straight lines obtained by respectively extending the plurality of line segments on the basis of a subject captured in the image for the each viewpoint; and calculating a relative posture relationship between the imaging unit and the detection unit on the basis of the detection result of the gravitational acceleration acquired for each of the plurality of viewpoints and the intersection specified for each of the plurality of viewpoints.

(13) A program for causing a computer to execute:

acquiring an image captured by an imaging unit and a detection result of a gravitational acceleration by a detection unit supported by the imaging unit, for each of a plurality of viewpoints different from one another;

extracting a plurality of line segments extending in a gravity direction from the image and specify an intersection of straight lines obtained by respectively extending the plurality of line segments on the basis of a subject captured in the image for the each viewpoint; and calculating a relative posture relationship between the imaging unit and the detection unit on the basis of the detection result of the gravitational acceleration acquired for each of the plurality of viewpoints and the intersection specified for each of the plurality of viewpoints.

REFERENCE SIGNS LIST

1 Information processing system
100 Information processing device
101 Image processing unit
103 Calculation unit
105 Input/output control unit
130 Information acquisition device
131 Imaging unit
133 Detection unit
151 Storage unit
153 Input unit
155 Output unit

The invention claimed is:

1. An information processing device comprising:
an acquisition unit configured to acquire an image captured by an imaging unit and a detection result of a gravitational acceleration by a detection unit supported by the imaging unit, for each of a plurality of viewpoints different from one another;
an image processing unit configured to extract a plurality of line segments extending in a gravity direction from the image and specify an intersection of straight lines obtained by respectively extending the plurality of line segments on a basis of a subject captured in the image for the each viewpoint;
a calculation unit configured to calculate a relative posture relationship between the imaging unit and the detection unit on a basis of the detection result of the gravitational acceleration acquired for each of the plurality of viewpoints and the intersection specified for the each of the plurality of viewpoints; and an output control unit configured to cause an output unit to output information for guiding movement of a position of the viewpoint such that positions of the intersections in a coordinate system associated with the imaging unit are different from each other,
wherein the acquisition unit, the image processing unit, the calculation unit, and the output control unit are each implemented via at least one processor.

2. The information processing device according to claim 1, wherein the calculation unit is further configured to make a first coordinate system associated with the imaging unit and a second coordinate system associated with the detection unit correspond to each other on a basis of the detection result of the gravitational acceleration acquired for the each viewpoint and a specification result of the intersection for the each viewpoint.

3. The information processing device according to claim 2, wherein the calculation unit is further configured to
calculate a vector in the gravity direction in the first coordinate system at the viewpoint on a basis of the specification result of the intersection for the each viewpoint, and
make the first coordinate system and the second coordinate system correspond to each other on a basis of the detection result of the gravitational acceleration acquired for each of the plurality of viewpoints and the vector in the gravity direction calculated for the each of the plurality of viewpoints.

4. The information processing device according to claim 3, wherein the calculation unit is further configured to calculate a function for converting a posture in one coordinate system into a posture in another coordinate system between the first coordinate system and the second coordinate system on a basis of the vector in the gravity direction in the first coordinate system and a vector according to the gravitational acceleration in the second coordinate system.

5. The information processing device according to claim 1, wherein the image processing unit is further configured to extract at least part of the plurality of line segments on a basis of a posture of an object held at the posture according to gravity, the object being captured as the subject in the image for the each viewpoint.

6. The information processing device according to claim 5, wherein the image processing unit is further configured to extract the line segment on a basis of the posture of the object, for each of a plurality of the objects captured as the subject in the image for the each viewpoint.

7. The information processing device according to claim 6, wherein at least part of the plurality of objects is a thread-like object with a fixed one end.

8. The information processing device according to claim 1, wherein the image processing unit is further configured to extract at least part of the plurality of line segments on a basis of an edge extending in the gravity direction of an object captured as the subject in the image for the each viewpoint.

9. The information processing device according to claim 8, wherein the object is a building having the edge extending in the gravity direction in at least part of the building.

10. The information processing device according to claim 1, wherein at least two or more viewpoints included in the plurality of viewpoints are set such that positions of the intersections in the coordinate system associated with the imaging unit are different from each other, the intersections being specified from the images captured by the imaging unit from the viewpoints.

11. The information processing device according to claim 1, wherein the output control unit is further configured to cause the output unit to output the information for guiding the movement of the position of the viewpoint such that, in at least two or more viewpoints of the plurality of viewpoints, the positions of the intersections in the coordinate system associated with the imaging unit are different from each other, the intersections being specified from the images captured by the imaging unit from the viewpoints.

12. An information processing method, by a computer, comprising:

acquiring an image captured by an imaging unit and a detection result of a gravitational acceleration by a detection unit supported by the imaging unit, for each of a plurality of viewpoints different from one another;

extracting a plurality of line segments extending in a gravity direction from the image and specify an intersection of straight lines obtained by respectively extending the plurality of line segments on a basis of a subject captured in the image for the each viewpoint;

calculating a relative posture relationship between the imaging unit and the detection unit on a basis of the detection result of the gravitational acceleration acquired for each of the plurality of viewpoints and the intersection specified for the each of the plurality of viewpoints; and outputting information for guiding movement of a position of the viewpoint such that positions of the intersections in a coordinate system associated with the imaging unit are different from each other.

13. A non-transitory computer-readable medium having embodied thereon a program, which when executed by a computer causes the computer to execute an information processing method, the method comprising:

acquiring an image captured by an imaging unit and a detection result of a gravitational acceleration by a detection unit supported by the imaging unit, for each of a plurality of viewpoints different from one another;

extracting a plurality of line segments extending in a gravity direction from the image and specify an intersection of straight lines obtained by respectively extending the plurality of line segments on a basis of a subject captured in the image for the each viewpoint;

calculating a relative posture relationship between the imaging unit and the detection unit on a basis of the detection result of the gravitational acceleration acquired for each of the plurality of viewpoints and the intersection specified for the each of the plurality of viewpoints; and outputting information for guiding movement of a position of the viewpoint such that positions of the intersections in a coordinate system associated with the imaging unit are different from each other.

* * * * *